(12) United States Patent
Ko et al.

(10) Patent No.: US 9,826,337 B2
(45) Date of Patent: Nov. 21, 2017

(54) INFORMATION TRANSMISSION METHOD AND SYSTEM, AND DEVICE

(71) Applicant: SAMSUNG ELECTRONICS CO., LTD., Suwon-si (KR)

(72) Inventors: Jae-woo Ko, Uiwang-si (KR); Tae-hwan Wi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 403 days.

(21) Appl. No.: 14/030,298

(22) Filed: Sep. 18, 2013

(65) Prior Publication Data

US 2014/0080419 A1 Mar. 20, 2014

(30) Foreign Application Priority Data

Sep. 18, 2012 (KR) .................. 10-2012-0103502
Sep. 4, 2013 (KR) .................. 10-2013-0106226

(51) Int. Cl.
*H04B 7/00* (2006.01)
*H04W 4/00* (2009.01)
(Continued)

(52) U.S. Cl.
CPC ......... *H04W 4/008* (2013.01); *H04L 67/2814* (2013.01); *H04L 67/38* (2013.01);
(Continued)

(58) Field of Classification Search
CPC ................................ H04W 4/008; H04N 7/14
(Continued)

(56) References Cited

U.S. PATENT DOCUMENTS

| 8,045,697 B1 | 10/2011 | Martin |
| 9,213,520 B2 | 12/2015 | Ohashi et al. |

(Continued)

FOREIGN PATENT DOCUMENTS

| CN | 102971700 A | 3/2013 |
| JP | 2002-150142 A | 5/2002 |

(Continued)

OTHER PUBLICATIONS

Search Report dated Jan. 16, 2014, issued by the International Searching Authority in counterpart International Application No. PCT/KR2013/008326.

(Continued)

*Primary Examiner* — Md Talukder
(74) *Attorney, Agent, or Firm* — Sughrue Mion, PLLC

(57) ABSTRACT

A method and system for transmitting information which is obtained from a peripheral object when an interactive service between devices is performed, and a device, are provided. The information transmission method includes: obtaining first information which is stored in a peripheral object of an electronic device via short distance communication with the peripheral object when an interactive service is performed between the electronic device and the at least one external device; generating second information that is to be transmitted to the at least one external device based on the obtained first information; and transmitting the second information to the at least one external device via the interactive service.

26 Claims, 16 Drawing Sheets

(51) Int. Cl.
*H04L 29/06* (2006.01)
*H04W 4/20* (2009.01)
*H04L 29/08* (2006.01)
*H04M 1/725* (2006.01)
*H04W 88/06* (2009.01)

(52) U.S. Cl.
CPC ......... *H04W 4/206* (2013.01); *H04L 67/2823* (2013.01); *H04M 1/72552* (2013.01); *H04M 1/72583* (2013.01); *H04M 2250/04* (2013.01); *H04W 88/06* (2013.01)

(58) Field of Classification Search
USPC ..................................... 455/41.1, 41.2, 41.3
See application file for complete search history.

(56) References Cited

U.S. PATENT DOCUMENTS

| | | | |
|---|---|---|---|
| 9,521,451 B2 | 12/2016 | DeWeese et al. | |
| 2003/0120745 A1 | 6/2003 | Katagishi et al. | |
| 2004/0176032 A1 | 9/2004 | Kotola et al. | |
| 2005/0218739 A1 | 10/2005 | Maddin et al. | |
| 2006/0279412 A1 | 12/2006 | Holland et al. | |
| 2008/0186145 A1* | 8/2008 | Manley | G06K 17/0022 340/10.4 |
| 2009/0108057 A1* | 4/2009 | Mu | H04M 1/72561 235/375 |
| 2009/0109277 A1* | 4/2009 | Kang | H04N 7/147 348/14.04 |
| 2009/0325484 A1 | 12/2009 | Lele et al. | |
| 2010/0149399 A1* | 6/2010 | Mukai | G01C 21/20 348/333.02 |
| 2010/0177114 A1* | 7/2010 | Nakashima | G02B 27/017 345/589 |
| 2011/0053508 A1* | 3/2011 | Hirose | H04L 43/0811 455/41.2 |
| 2011/0312303 A1* | 12/2011 | Brush | H04M 3/38 455/414.1 |
| 2012/0236023 A1* | 9/2012 | Yokoyama | H04N 9/3179 345/619 |
| 2012/0262492 A1* | 10/2012 | Ohashi | G01C 21/3664 345/660 |
| 2012/0293654 A1* | 11/2012 | Ikegami | H04N 7/185 348/143 |
| 2013/0080225 A1* | 3/2013 | Rajaram | G06Q 50/01 705/14.16 |
| 2013/0124617 A1* | 5/2013 | Lee | H04L 67/1097 709/203 |
| 2013/0132081 A1* | 5/2013 | Ryu | G10L 21/06 704/235 |
| 2013/0136363 A1 | 5/2013 | Na | |
| 2013/0203353 A1* | 8/2013 | Kim | H04B 7/24 455/41.2 |
| 2013/0268894 A1* | 10/2013 | Jeon | G06F 3/04817 715/835 |
| 2014/0080419 A1* | 3/2014 | Ko | H04L 67/2814 455/41.3 |
| 2014/0119647 A1* | 5/2014 | Cheong | G06T 9/00 382/166 |
| 2014/0141721 A1* | 5/2014 | Kim | H04M 1/7253 455/41.2 |
| 2014/0324962 A1* | 10/2014 | Lewin | H04L 67/141 709/204 |
| 2015/0026580 A1* | 1/2015 | Kang | G06F 3/167 715/728 |

FOREIGN PATENT DOCUMENTS

| | | |
|---|---|---|
| JP | 2002-524935 | 8/2002 |
| JP | 3104763 U | 8/2004 |
| JP | 2005-316993 A | 11/2005 |
| KR | 10-0732332 B1 | 6/2007 |
| KR | 10-2009-0127244 A | 12/2009 |
| KR | 10-2012-0014480 A | 2/2012 |
| RU | 2349957 C1 | 3/2009 |
| RU | 2009141616 A | 7/2011 |
| WO | 2005/091997 A2 | 10/2005 |

OTHER PUBLICATIONS

Communication from the European Patent Office issued Aug. 5, 2014 in a counterpart European Application No. 13184719.6.
Communication dated Jun. 6, 2016, issued by the Russian Patent Office in counterpart Russian Application No. 2015114562.
Communication dated May 2, 2017, issued by the State Intellectual Property Office of P.R. China in counterpart Chinese Application No. 201310426551.X.
Communication dated Sep. 25, 2017, issued by the Japanese Patent Office on counterpart Japanese Application No. 2013-191468.

* cited by examiner

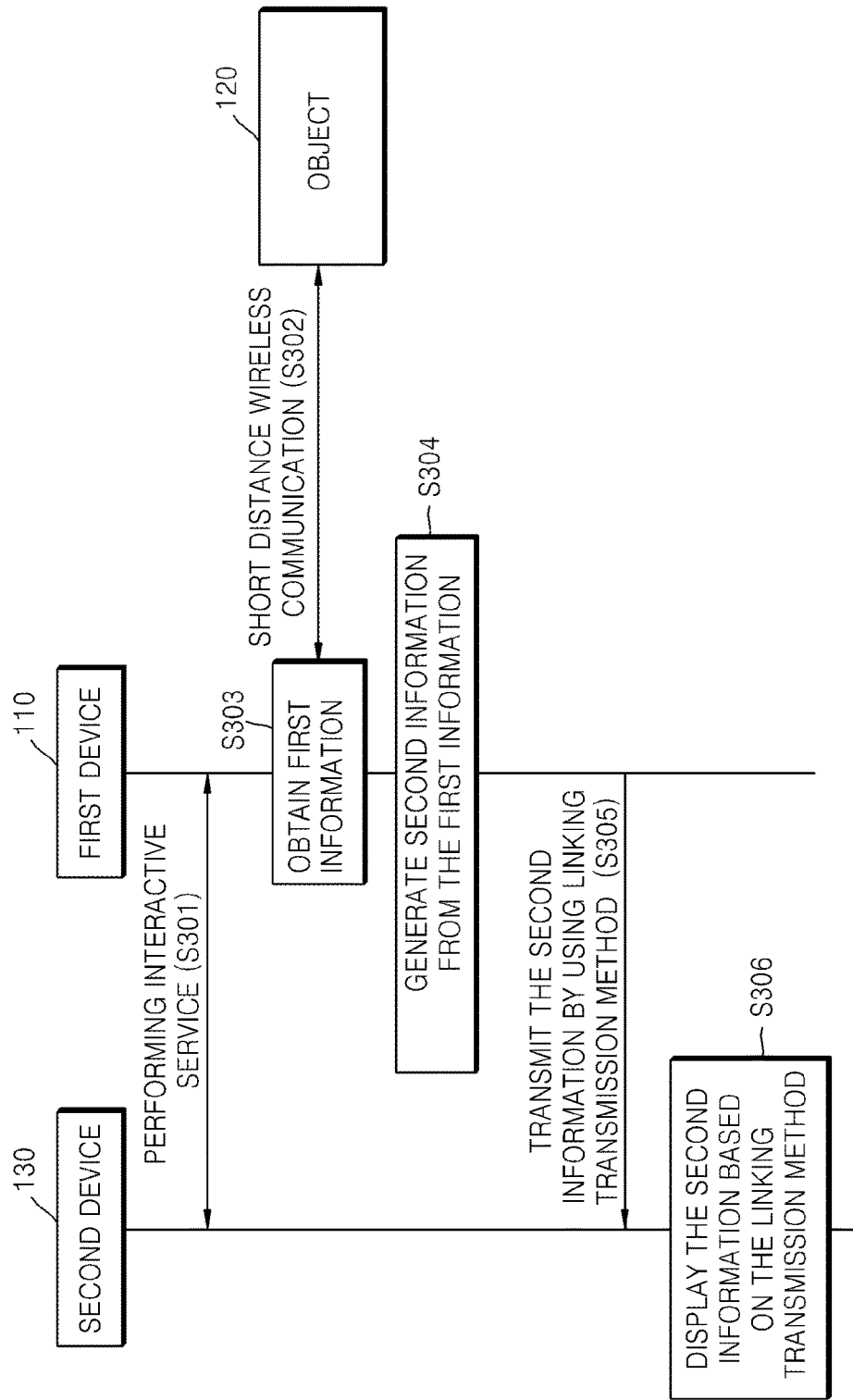

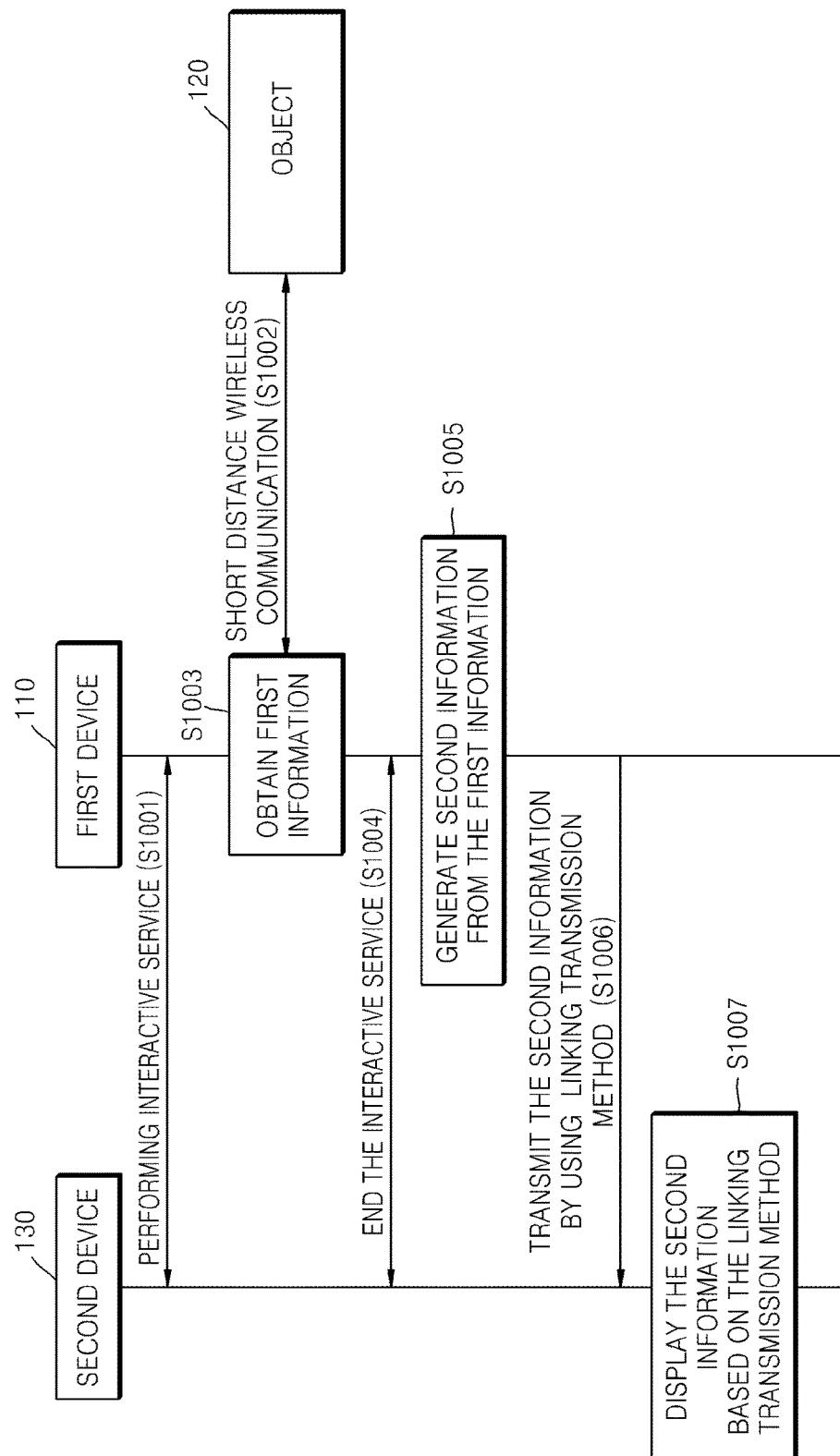

INFORMATION TRANSMISSION METHOD AND SYSTEM, AND DEVICE

CROSS-REFERENCE TO RELATED PATENT APPLICATION

This application claims priority from Korean Patent Application No. 10-2012-0103502 filed on Sep. 18, 2012, and Korean Patent Application No. 10-2013-0106226 filed on Sep. 4, 2013, in the Korean Intellectual Property Office, the disclosures of which are incorporated herein by reference in their entireties.

BACKGROUND

1. Field

Exemplary embodiments relate to information transmission, and more particularly to, a method and system for transmitting information between devices which are capable of using an interactive service, and a device.

2. Description of the Related Art

With development of communication technology, interactive services between devices have become diverse. In particular, various types of interactive services, such as a messenger service, an e-mail service, a video call service, a voice call service, and a social network service, are available.

With such diverse types of interactive services, diverse services based on an interactive service environment are currently being proposed.

SUMMARY

Exemplary embodiments provide a method and system for transmitting information which is obtained from peripheral objects of devices to an external device when an interactive service between the devices is performed, and a device.

Exemplary embodiments also provide a method and system for transmitting information which is obtained from peripheral objects of devices to an external device in real time when an interactive service between the devices is performed, and a device.

Exemplary embodiments also provide a method and system for transmitting information which is obtained from peripheral objects of devices to an external device by using another communication method when an interactive service between the devices is performed, and a device.

Exemplary embodiments also provide a method and system for sharing information which is obtained from peripheral objects of devices with an external device when an interactive service between the devices is performed, and a device.

Exemplary embodiments also provide a method and system for sharing information which is obtained from peripheral objects of devices with an external device by using another communication method when an interactive service between the devices is performed, and a device.

According to an aspect of one or more exemplary embodiments, there is provided a method for using an electronic device to provide information, the method including: obtaining, by the electronic device, first information which is stored in a peripheral object of the electronic device when an interactive service is performed between the electronic device and at least one external device; generating second information that is to be provided to the at least one external device based on the obtained first information; and causing the second information to be provided to the at least one external device.

The obtaining the first information may include obtaining the first information via short distance communication with the peripheral object.

The causing the second information to be provided to the at least one external device may include using the electronic device to transmit the second information to the at least one external device via the interactive service.

The causing the second information to be provided to the at least one external device may include using the electronic device to prompt the at least one external device to obtain the second information from a server.

The causing the second information to be provided to the at least one external device may include transmitting a request to a server, wherein the second information is provided to the at least one external device as a result of the request.

The first information may include a uniform resource locator (URL), and the generating the second information may include accessing the URL and extracting the second information from information which is available via the URL.

The peripheral object may include a tag for use with respect to the short distance communication, wherein the first information includes information which is stored in the tag.

The generating the second information may include extracting the second information from the first information.

The method may further include: converting a data format of the second information so that the second information is transmittable via the interactive service.

The method may further include: after using the electronic device to transmit the second information to the at least one external device, displaying a message which indicates a transfer status with respect to the second information.

The generating the second information may include: displaying the first information; and generating the second information when a request for a transmission of the displayed first information is received.

The short distance communication may be based on one of near field communication (NFC)-based short distance wireless communication, radio frequency identification (RFID)-based short distance wireless communication, Bluetooth low energy (BLE)-based short distance wireless communication, a barcode recognition-based technology, and a quick response (QR) code recognition-based technology.

According to another aspect of one or more exemplary embodiments, there is provided an electronic device including: an information obtainer which is configured to obtain first information which is stored in a peripheral object; a communication interface which is configured to cause second information which is generated based on the first information to be provided to at least one external device when an interactive service is performed between the electronic device and the at least one external device; an information input and output interface which is configured to input and output information; and a processor which is configured to generate the second information based on the first information when the interactive service between the electronic device and the at least one external device is performed via the communication interface, and to control the communication interface to cause the second information to be provided to the at least one external device.

According to another aspect of one or more exemplary embodiments, there is provided an information transmission system including: a first device which is configured to obtain first information which is stored in a peripheral object via short distance communication with the peripheral object when an interactive service between the first device and at least one second device is performed, generate second information based on the obtained first information, and transmit the second information to the at least one second device via the interactive service; and the at least one second device which is configured to receive the second information from the first device via the interactive service and to output the received second information.

According to another aspect of one or more exemplary embodiments, there is provided a non-transitory computer readable recording medium storing one or more programs including a command language for executing a method for using an electronic device to provide information, wherein the method for using an electronic device to provide information is performed in the same manner as the above-described method.

BRIEF DESCRIPTION OF THE DRAWINGS

The above and other aspects will become more apparent by describing in detail exemplary embodiments with reference to the attached drawings in which:

FIG. 3 is a flowchart which illustrates an information transmission method, according to an exemplary embodiment;

FIG. 10 is a flowchart which illustrates an information transmission method, according to another exemplary embodiment;

DETAILED DESCRIPTION

Figure 1:
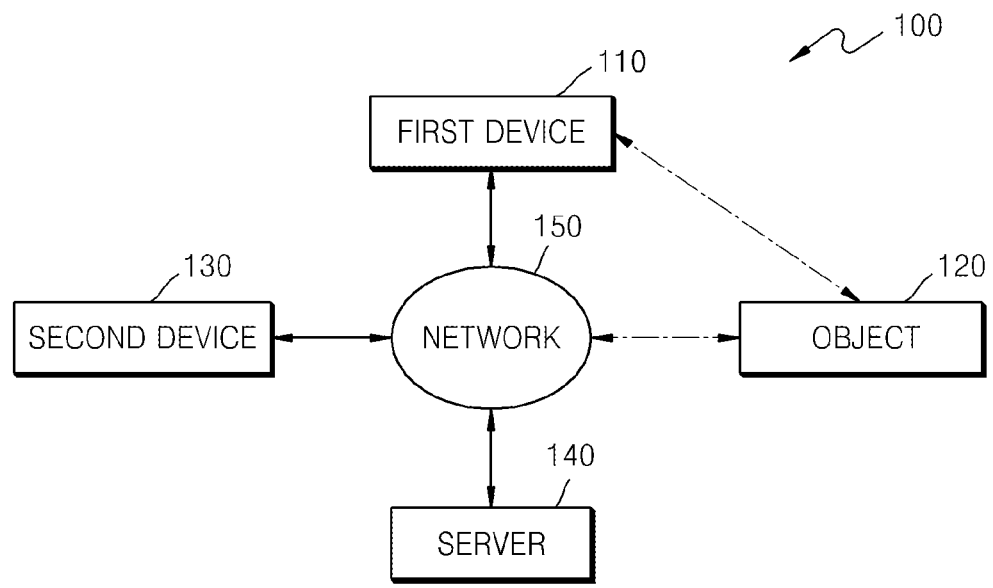
FIG. 1 illustrates a configuration of an information transmission system, according to an exemplary embodiment.

As the present inventive concept allows for various changes and numerous embodiments, particular exemplary embodiments will be illustrated in the drawings and described in detail in the written description. However, this is not intended to limit the present inventive concept to particular modes of practice, and it will be appreciated that all changes, equivalents, and substitutes that do not depart from the spirit and technical scope of the present inventive concept are encompassed in the present inventive concept. In the description of the exemplary embodiments, certain detailed explanations of the related art are omitted when it is deemed that they may unnecessarily obscure the essence of the one or more exemplary embodiments.

Terms such as "first" and "second" are used herein merely to describe a variety of constituent elements, but the constituent elements are not limited by the terms. The terms are used only for the purpose of distinguishing one constituent element from another constituent element.

Most of the terms used herein are general terms that are widely used in the technical art to which the exemplary embodiments pertain. However, some of the terms used herein may be created to reflect intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present disclosure.

As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, components, and/or groups thereof, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Throughout the specification, a user input may depend on a user gesture, but a user input is not limited thereto.

When an input apparatus is based on a touch screen, the user gesture may include at least one of a tap, a touch and hold, a double tap, dragging, panning, a flick, a drag and drop, a sweep, and the like, but the user gesture is not limited thereto. A user touch based on the touch screen may be performed, for example, by a user using his/her finger and/or a touch tool (for example, a stylus pen).

When an input apparatus is based on a motion sensor, the user input may depend on a user gesture causing a device motion (for example, device shaking, device tapping, and/or any other suitable device motion). The motion sensor may include at least one of an acceleration sensor, a terrestrial magnetic sensor, a gyro sensor, and an orientation sensor.

When the input apparatus is based on a camera, the user gesture may include a space gesture which is based on an image captured by the camera. The camera may be based on an image sensor and/or a light sensor.

When the input apparatus includes a physical button, a dial, a slider switch, a joystick, a click wheel, and/or any other suitable mechanism for providing input, the user input may be dependent on physical control by the user with respect to the input apparatus. When the input apparatus is based on an audio input apparatus, the user input information may be dependent on a voice signal of the user based on a spoken language.

According to example arrangements, first information which is stored in a peripheral object of the electronic device is obtained by the electronic device and used to generate second information for providing to at least one external device. The peripheral object may be considered to be an object peripheral to the electronic device such as any object having information that is accessible to the electronic device. This includes objects such as products, adverts and information presenting entities external to the electronic device.

The exemplary embodiments will now be described more fully with reference to the accompanying drawings, in which exemplary embodiments of the invention are shown. Like reference numerals in the drawings denote like elements and thus their descriptions will not be repeated herein.

FIG. 1 illustrates a configuration of an information transmission system 100, according to an exemplary embodiment.

Referring to FIG. 1, the information transmission system 100 includes a first device 110, an object 120, a second device 130, a server 140, and a network 150, but is not limited thereto. In particular, the information transmission system 100 may include more or less constituent elements than those shown in FIG. 1.

For example, the information transmission system 100 may include a plurality of objects 120. The information transmission system 100 may include a plurality of second devices 130. The information transmission system 100 may include a plurality of servers 140. The information transmission system 100 may not include the server 140. In the drawings, when the information transmission system 100 does not include the server 140, a dotted line between the object 120 and the network 150 may be omitted.

The first device 110 may be referred to as an electronic device. The second device 130 may be referred to as an external device to which the first device 110 transmits information. The object 120 may be a peripheral object of the first device 110 or an external object of the first device 110, or a short distance communication module. The first device 110 may obtain information which is stored in the object 120 via short distance communication when performing an interactive service with the second device 130 via the network 150. The interactive service is a bidirectional communication service such as, for example, a messenger service, an e-mail service, a video call service, a voice call service, and a social network service, but is not limited thereto. Examples of the peripheral object include at least an object peripheral to the electronic device such as an object accessible to the electronic device. For example an object capturable by a camera of the electronic device or readable by a reading assembly of the electronic device. Further examples of the peripheral object include at least a consumer product in the vicinity of the electronic device providing information accessible to the electronic device, an advertising hoarding displaying information regarding an even/product of potential interest to a user of the electronic device or a monitoring device such as a personal health monitoring device holding information readable by or otherwise accessible to the electronic device.

The object 120 may store the information that may be obtained by the first device 110 via short distance communication. The information which is stored in the object 120 may be at least one of audio, video, and text which is produced in a digital signal form. The object 120 may store information that may be collected in everyday life and/or metadata of the information that may be collected. The metadata of the information may include information which is accessible to the information that may be collected in everyday life. For example, the metadata may include a uniform resource locator (URL) of a homepage where performance information may be accessed, but is not limited thereto.

The information which is stored in the object 120 may include, for example, performance information (for example, a performance place, a performance location, a reservation place, a reservation rate, and/or any other information type which relates to a performance), goods information (for example, specification information or component information, and/or any information type which relates to goods), shop information (for example, shop location information, information about goods for sale, menu information, and/or any other information type which relates to a shop), name card information, poster information (for example, a URL of a site providing detailed information, abstract information, and/or any other suitable poster information type), phone number information, address information, local information (for example, specialty information, cultural assets information, a URL of a site providing detailed information, and/or any other suitable information type which relates to a locality), advertisement information (for example, sponsor information, related media information, and/or any other suitable information type which relates to an advertisement), sample sound source information, movie preview information (for example, a synopsis, and/or any other suitable information type which relates to a movie preview), and the like, but is not limited thereto.

The information which is stored in the object 120 may be referred to as context-aware information or content. For example, when the information which is stored in the object 120 is the shop information, a user of a device which receives the information may know a current location of a user of a device which is transmitting the information, and thus the information stored in the object 120 may be the context-aware information. When the information stored in the object 120 is the movie synopsis, the information may be text based content.

When an amount of the information which is stored in the object 120 is greater than that of information that may be communicated between the first device 110 and the object 120, the object 120 may transmit only the metadata to the first device 110. Whether the amount of the information stored in the object 120 is greater than that of information that may be communicated between the first device 110 and the object 120 may be determined based on an information transmission speed with respect to a communication link between the first device 110 and the object 120.

The object 120 may be configured to include a short distance communication module based on near field communication (NFC), radio frequency identification (RFID), or Bluetooth low energy (BLE), but a mode of short distance communication is not limited thereto.

When the object 120 includes a short distance communication module based on NFC or RFID, the object 120 may be configured in tag form. When the object 120 includes a short distance communication module based on BLE, the object 120 may be configured to broadcast Bluetooth-based information. When the object 120 is configured as described above, a communication service between the object 120 and the first device 110 may be referred to as a short distance communication service.

The object 120 may be configured based on short distance visual communication by using a code, such as, for example a barcode or a quick response (QR) code. The term "short distance visual communication" refers to obtaining visual information (for example, an image, a book, a material, and/or any other suitable visual information) wirelessly at a short distance. The short distance is a distance range within which the information may be recognized visually.

For example, short distance visual communication may include obtaining information by capturing the visual information from within a predetermined distance via a camera, or obtaining information by using an amount of light reflected by projecting a laser beam onto the visual information, but is not limited thereto. The above-described predetermined distance may be a short distance range within which the information may be recognized visually, for example, between approximately 7 cm and approximately 10 cm, but is not limited thereto.

When the object 120 is configured based on short distance visual communication, the object 120 may be configured as the barcode or the QR code or a barcode display module or a QR code display module. The object 120 may be replaced with a barcode or a QR code or a code that does not include an electronic constituent element. In this case, the object 120 may be referred to as the code, the barcode, or the QR code.

When the object 120 is replaced with the barcode or the QR code, the first device 110 may obtain information which relates to the barcode or the QR code by executing an application which corresponds to a barcode scanner or a QR code scanner. When the object 120 is replaced with the barcode or the QR code as described above, obtaining peripheral information based on short distance communication which is performed by the first device 110 may be referred to as obtaining peripheral information based on code recognition technology.

When the object 120 is configured as the barcode or QR code display module, the first device 110 may obtain the information which relates to the barcode or the QR code by executing the application which corresponds to the barcode scanner or the QR code scanner as described above, or may receive the information which relates to the barcode or the QR code from a communication module which is included in the above-described barcode or QR code display module. The communication module included in the barcode or QR code display module may be configured, for example, based on short distance wireless communication such as Bluetooth, but is not limited thereto.

When the object 120 includes a communication module based on NFC or RFID, the first device 110 may obtain information from the object 120 by using an NFC based short distance wireless communication function and/or an RFID based short distance wireless communication function. When the object 120 is configured to include a communication module based on BLE, the first device 110 may obtain information from the object 120 by using a Bluetooth communication function of receiving a signal which has been broadcasted based on BLE.

The network 150 includes a wired network and/or a wireless network. For example, the network 150 may be configured as a wireless communication network including any one or more of wireless Internet, wireless Intranet, a wireless phone network, a wireless local area network (LAN), a Wi-Fi network, a Wi-Fi direct (WFD) network, a 3G network, a 4G Long Term Evolution (LTE) network, a Bluetooth network, an infrared data association (IrDA) network, a RFID network, a ultra wideband (UWB) network, and a Zigbee network or a wired communication network including wired Internet, but is not limited thereto.

The server 140 may transmit and receive data to and from the first device 110 and the second device 130 over the network 150. In particular, if the server 140 receives a request for original information which is based on the metadata from the first device 110 or the second device 130, the server 140 may provide the original information to the first device 110 and/or the second device 130. In case where the first device 110 obtains the metadata from the object 120, the server 140 may receive the request for original information based on the metadata from the first device 110 or the second device 130. The server 140 may be referred to as an information providing server or a cloud server.

The information stored in the object 120 may be information which is provided from the server 140 over the network 150 according to circumstances. In this case, the object 120 may include a short distance communication function with the first device 110 and a communication function with the server 140 over the network 150.

The first device 110 transmits the information obtained from the object 120 to the second device 130 over the network 150. In this case, the first device 110 may be referred to as an information transmission device, and the second device 130 may be an information reception device.

The first device 110 may determine whether to transmit the above-described obtained information to the second device 130 based on a security level of the information obtained from the object 120 and a security level of the second device 130. To this end, the object 120 may further store security level information which relates to the stored information, and the second device 130 may provide security level information which relates to the second device 130 to the first device 110 when performing the interactive service with the first device 110. However, transmitting the security level information of the information stored in the object 120 and the security level information which relates to the second device 130 to the first device 110 is not limited thereto.

The information obtained from the object 120 may be transmitted by using an interactive service between the first device 110 and the second device 130. However, the information obtained from the object 120 may be transmitted by using a transmission method which links with the interactive service between the first device 110 and the second device 130. The transmission method which links with the interactive service may include a communication method which is capable of transmitting the obtained information to the second device 130 without interrupting the interactive service between the first device 110 and the second device 130 while operating in parallel with the interactive service.

The transmission method which links with the interactive service may be determined based on a type of the interactive service between the first device 110 and the second device 130 and a type of the obtained information. For example, when the type of the interactive service between the first device 110 and the second device 130 is the voice call service, and the type of the obtained information is at least one of texts, images, and audio, the transmission method which links with the interactive service method may be a short message service (SMS)/multimedia messaging service (MMS), but is not limited thereto. The above-described transmission method which links with the interactive service may be a communication method which is different from a communication method which is based on the type of the interactive service between the first device 110 and the second device 130.

When the interactive service between the first device 110 and the second device 130 is ChatON that is a messenger service, and the type of the obtained information is at least one of texts, images, and audio, the transmission method which links with the interactive service may be ChatON. The above-described transmission method may use the interactive service between the first device 110 and the second device 130. The first device 110 may include a device which performs short distance communication with the object 120 and communication with the second device 130 and/or the server 140 over the network 150.

The first device 110 may generate information that is to be transmitted to the second device 130 from the information obtained from the object 120. When the obtained information is first information, and the information that is to be transmitted to the second device 130 is second information, the first device 110 may extract the second information based on the first information.

For example, when the first information includes the original information and metadata which relates to the original information, the second information may include the metadata which relates to the original information. When the first information includes the original information and the security level information, the second information may include the original information.

The first device 110 may set reference information which may be used to extract the second information from and/or on a basis of the first information. The reference information may be set by a user of the first device 110. The reference information may be previously set in the first device 110. The reference information may include, for example, information which relates to an amount of data, but is not limited thereto. For example, in case where the reference information is information which relates to a predetermined amount of the data and an amount of data of the first information is greater than the predetermined amount of the data, the first device 110 may extract the second information which has an amount of data smaller than that of the first information. To extract the second information having the amount of data smaller than that of the first information, the first device 110 may be configured to use priority information which is determined according to a type (for example, an image, a text, and/or music, and/or any other suitable data type) of data which is included in and/or referenced by the first information.

A data format of the second information may be changed based on a transmission method from the first device 110 to the second device 130. For example, when the first information is in text form, the interactive service is the voice call service, and the above-described transmission method (or an information transmission method) which links with the interactive service is the voice call service, the first device 110 may extract the second information that may be converted into a voice signal from the first information that is in text form, convert the extracted second information into the voice signal, and transmit the converted voice signal to the second device 130 by using the voice call service.

When the first information is an image file, and the interactive service between the first device 110 and the second device 130 is the messenger service, the first device 110 may convert the second information which is extracted from and/or based on the first information into an image format which is supported by the messenger service. In this case, the first information and the second information may be the same. Further, when the first information is the metadata, the first information and the second information may be the same.

When the first information is the image file, and the interactive service between the first device 110 and the second device 130 is the voice call service, the second information which is extracted from and/or based on the first information may be information which explains and/or describes the first information. The information which explains and/or describes the first information may include, for example, information which relates to a type of the first information (for example, information which relates to a data format (for example, image, text, music, and/or any other suitable data format) of the first information), an object name included in the first information, information which relates to a place or/and date at which an image is obtained, and/or any other suitable type of explanatory or descriptive information, but is not limited thereto. The second information which explains and/or describes the first information is converted into a voice signal, and the converted voice signal is transmitted to the second device 130.

Each of the first device 110 and the second device 130 may include, for example, any one or more of a smart phone, a notebook, a tablet personal computer (PC), a mobile device, a handheld device or a handheld PC, an e-book terminal which has a communication function, a smart TV which has the communication function, a navigation system having the communication function, a digital consumer electronics (CE) device which has the communication function (for example, a refrigerator which has the communication function, an air conditioner which has the communication function, and/or any other suitable consumer electronics device which has a communication function), and/or a device such as a personal digital assistant (PDA), but is not limited thereto. The first device 110 and the second device 130 have the communication function as described above, and thus they may be used as communication devices.

The second device 130 communicates with the first device 110 and/or the server 140 over the network 150. In particular, the second device 130 may perform the interactive service with the first device 110. The second device 130 may be the same type as or a different type from the first device 110. For example, the first device 110 and the second device 130 may be both smart phones. However, the first device 110 may be the smart phone, whereas the second device 130 may be the tablet PC, or the first device 110 may be the tablet PC, whereas the second device 130 may be the smart phone. The second device 130 may be an external device and/or an auxiliary device of the first device 110. The first device 110 may be an external device and/or an auxiliary device of the second device 130.

Meanwhile, the first device 110 may automatically execute a related application based on information obtained from the object 120 in a home screen mode and insert the information obtained from the object 120 into the related application. In this case, if the first device 110 is connected to the second device 130 by using the related application over the network 150, the first device 110 may transmit the obtained information to the second device 130. In this regard, the related application includes an application which may be used to transmit information based on the above-described network 150. For example, the related application may be the messenger service.

The related application may be an application (for example, an information sharing application) which is used to transmit information over a machine to machine (M2M), peer to peer (P2P), or device to device (D2D) based network. The M2M, P2P, or D2D based network may include, for example, any one or more of a WFD communication network, a Bluetooth communication network, an IrDA communication network, and an RFID communication network.

Figure 2A:
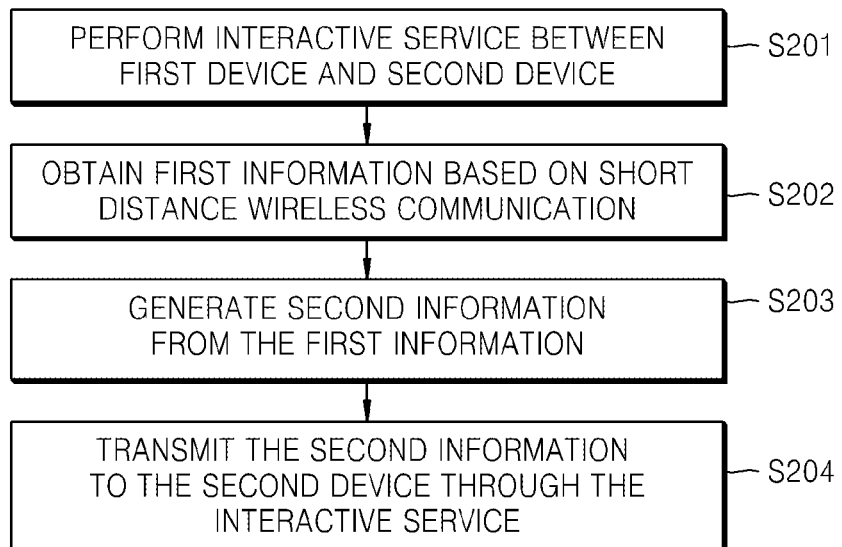
FIG. 2A is a flowchart which illustrates an information transmission method which is performable by using a first device, according to an exemplary embodiment.

FIG. 2A is a flowchart which illustrates an information transmission method which is performable by using the first device 110, according to an exemplary embodiment. FIG. 2A shows a case in which information obtained from the object 120 is transmitted via an interactive service between the first device 110 and the second device 130.

In operation S201, the interactive service is performed between the first device 110 and the second device 130, and in operation S202, the first device 110 obtains first information from the object 120 based on short distance wireless communication. The interactive service between the first device 110 and the second device 130 may be one of service methods mentioned in relation to FIG. 1, and the method for obtaining the first information may be any one or more of information obtaining methods which are described above in relation to FIG. 1.

For example, when a voice call service is performed between the first device 110 and the second device 130 in operation S201, the first device 110 may obtain the first information stored in the object 120 via an NFC contact in operation S202. If a distance between the first device 110 and the object 120 is within an NFC communication range, the NFC contact may take place.

The interactive service may not be performed based on short distance communication. Thus, the interactive service may be referred to as a service which is performed based on communication other than short distance communication.

In operation S203, the first device 110 generates second information to be transmitted to the second device 130 from and/or based on the first information. The generating of the second information from and/or based on the first information is the same as described above with reference to FIG. 1. Thus, the first information and the second information may be different or the same. Operation S203 may include an operation by which the first device 110 extracts the second information from and/or based on the first information. The extracting of the second information from and/or based on the first information is the same as described above with reference to FIG. 1.

Operation S203 may be redefined to include operations of displaying the first information on the first device 110 and generating the second information in response to and/or as a result of a request to transmit the first information displayed on the first device 110.

In operation S204, the first device 110 transmits the second information generated in operation S203 to the second device 130 via the interactive service.

FIG. 2A may be changed to further include an operation of changing a data format of the second information so that the second information is transmittable via the interactive service before the first device 110 performs operation S204 (i.e., before the first device 110 transmits the second information to the second device 130). For example, when the interactive service is a messenger service, and the second information has a data format by which the second information is not transmittable via the messenger service, the first device 110 may change the data format of the second information so that the second information is transmittable via the messenger service.

Meanwhile, if the interactive service is the messenger service, and the second information has a data format by which the second information is transmittable via the messenger service, the first device 110 may not change the data format of the second information. However, when the second information has a data format by which the second information is transmittable via the interactive service, but an amount of the second information is greater than a maximum amount of information that may be transmitted via the interactive service, the first device 110 may compress the second information and transmit the compressed second information to the second device 130.

FIG. 2A may also be changed to further include an operation of displaying a message which indicates a transfer status with respect to the second information on the first device 110 after the first device 110 transmits the second information to the second device 130.

Figure 2B:
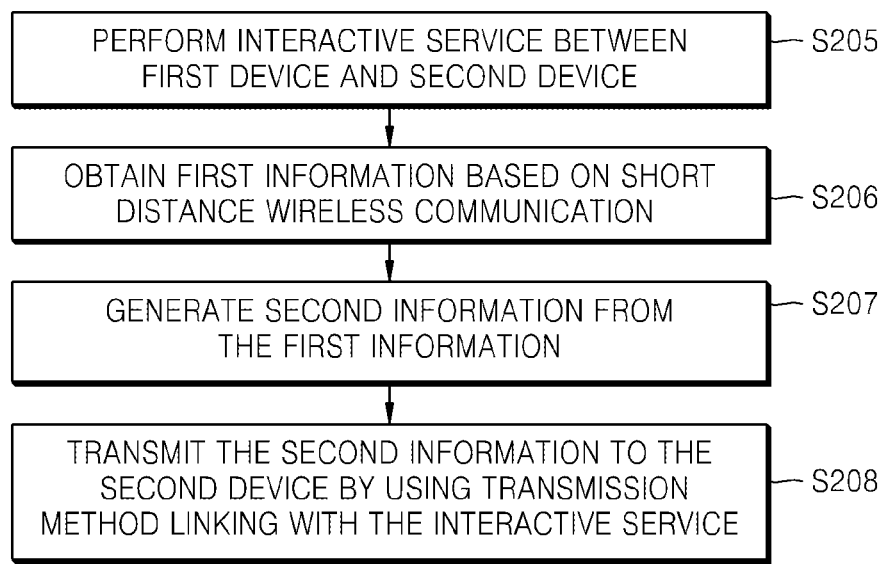
FIG. 2B is a flowchart which illustrates an information transmission method which is performable by using a first device, according to another exemplary embodiment.

FIG. 2B is a flowchart which illustrates an information transmission method which is performable by using the first device 110, according to another exemplary embodiment. FIG. 2B shows a case in which the first device 110 transmits information obtained from the object 120 to the second device 130 by using a transmission method which links with an interactive service.

In operation S205, an interactive service is performed between the first device 110 and the second device 130, and in operation S206, the first device 110 obtains first information from the object 120 based on short distance wireless communication. The interactive service between the first device 110 and the second device 130 may be any one or more of service methods which are described above in relation to FIG. 1, and the method for obtaining the first information may be any one or more of information obtaining methods which are described above in relation to FIG. 1.

In operation S207, the first device 110 generates second information to be transmitted to the second device 130 from and/or based on the first information. The generating of the second information from and/or based on the first information is the same as described above with reference to FIG. 1. Operation S207 may include an operation by which the first device 110 extracts the second information from and/or based on the first information.

Operation S207 may be redefined to include operations of displaying the first information on the first device 110 and generating the second information in response to and/or as a result of a request to transmit the first information displayed on the first device 110.

In operation S208, the first device 110 transmits the second information generated in operation S207 to the second device 130 by using the transmission method which links with the interactive service.

The transmission method which links with the interactive service may be determined based on a type (or a data format) of the obtained information and a communication method as described above with reference to FIG. 1, or may be previously set. For example, when the interactive service is a voice call service, if the transmission method which links with the interactive service is previously set as SMS/MMS, and communication between the first device 110 and the second device 130 is the voice call service, the first device 110 transmits the second information to the second device 130 via the SMS/MMS.

When the first device 110 transmits the second information by using the linking transmission method, the first device 110 may convert a data format of the second information based on the linking transmission method. For example, when the first device 110 transmits the second information which is generated from and/or based on the first information obtained via an NFC contact via the SMS/MMS, the first device 110 converts the data format of the second information so that the second information may be transmitted via the SMS/MMS. When the first device 110 transmits the second information which is generated from and/or based on the first information obtained via the NFC contact via a social networking service (SNS)/e-mail, the first device 110 converts the data format of the second information so that the second information may be transmitted via the (SNS)/e-mail.

In operation S208, the first device 110 may determine whether to transmit the obtained first information based on security level information which relates to the first information and security level information which relates to the second information as described above with reference to FIG. 1.

FIG. 3 is a flowchart which illustrates an information transmission method, according to an exemplary embodiment. The flowchart of FIG. 3 illustrates operations between the first device 110, the object 120, and the second device 130 when the first device 110 operates as in the flowchart of FIG. 2B.

In operation S301, an interactive service is performed between the first device 110 and the second device 130, and in operations S302 and S303, the first device 110 obtains first information from the object 120 based on short distance wireless communication. The first information may be information that may be collected in everyday life and/or metadata which relates to the information that may be collected as described above with reference to FIG. 1.

In operation S304, the first device 110 generates second information from and/or based on the first information. The generating of the second information from and/or based on the first information is the same as described above with reference to FIG. 2B.

In operation S305, the first device 110 transmits the second information to the second device 130 by using a transmission method which links with the interactive service. The transmission method which links with the interactive service may be previously set based on a communication method. For example, the transmission method which links with the interactive service may be previously set as SMS/MMS with respect to a voice call service, but is not limited thereto. Thus, when the interactive service currently performed between the first device 110 and the second device 130 is the voice call service, the first device 110 transmits the second information to the second device 130 via the SMS/MMS that is the previously set linking transmission method. In this regard, the first device 110 may change a data format of the second information by which the second information is transmittable via the SMS/MMS.

In operation S306, the second device 130 displays the second information which is received based on the transmission method (for example, the SMS/MMS) linking with the interactive service of operation S301.

Figure 4:
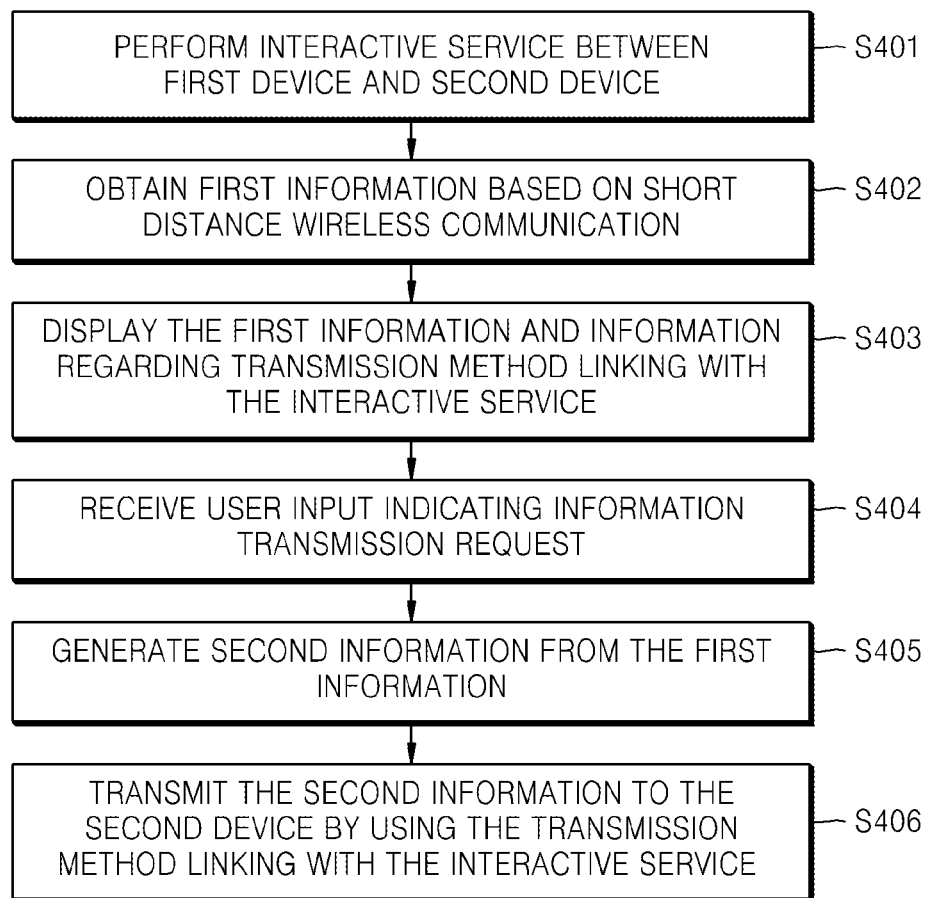
FIG. 4 is a flowchart which illustrates an information transmission method which is performable by using a first device, according to another exemplary embodiment.

FIG. 4 is a flowchart which illustrates an information transmission method which is performable by using the first device 110, according to another exemplary embodiment.

FIG. 4 shows a case in which the first device 110 transmits second information to the second device 130 in response to and/or as a result of a user transmission request based on obtained first information and a linking transmission method.

Figure 5:
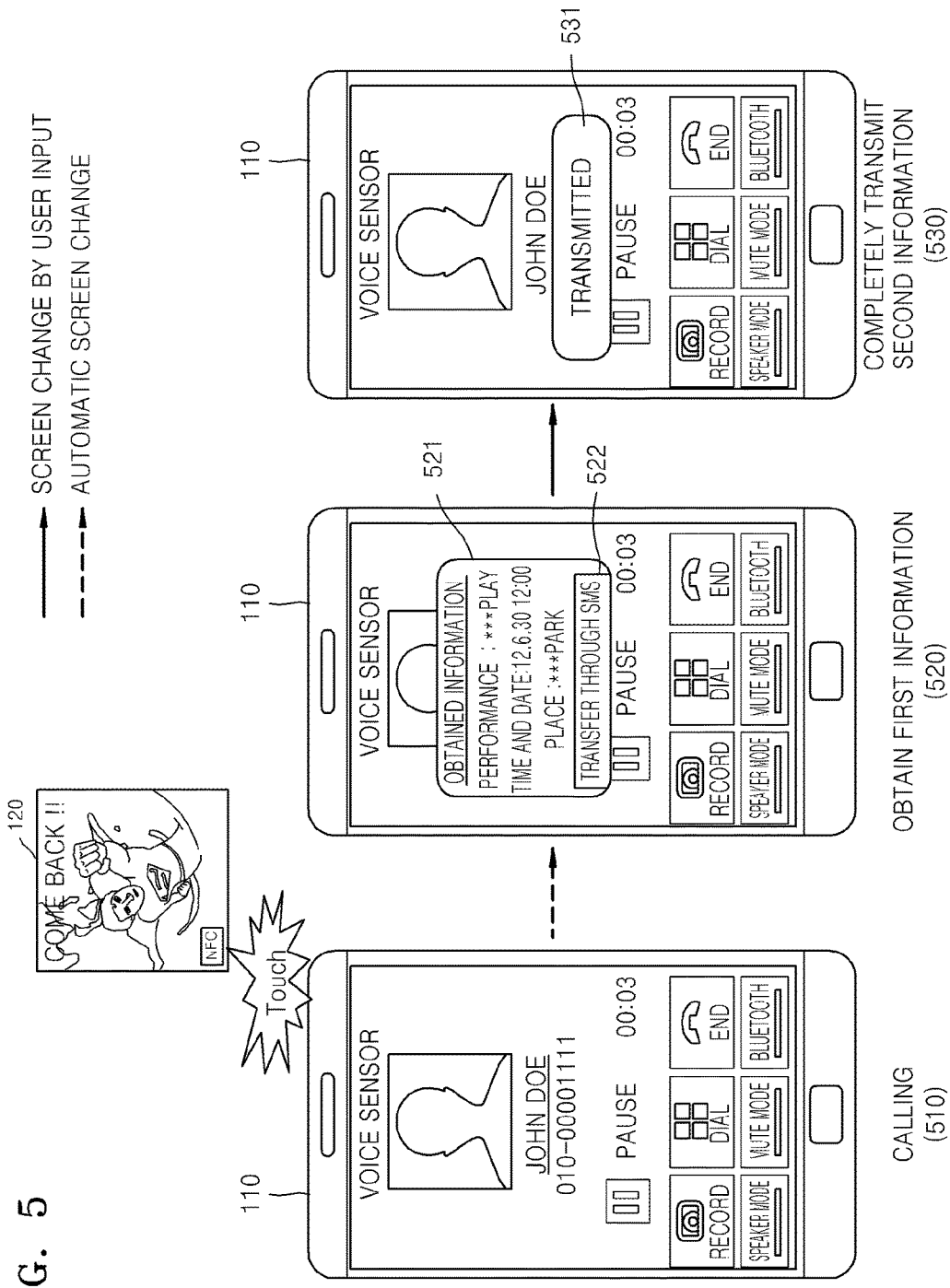
FIG. 5 shows examples of screens which are displayed on the first device when a voice call service is performed between a first device and a second device, according to an exemplary embodiment.

In operation S401, the first device 110 performs an interactive service with the second device 130. For example, referring also to FIG. 5, when the interactive service between the first device 110 and the second device 130 is a voice call service, the first device 110 displays a screen 510 of FIG. 5 in operation S401. FIG. 5 shows examples of screens which may be displayed on the first device 110 when the interactive service between the first device 110 and the second device 130 is the voice call service.

In operation S402, the first device 110 obtains the first information from the object 120. The method for obtaining the first information may be determined based on the object 120 as described above with reference to FIG. 1.

In operation S403, the first device 110 displays the first information and information which relates to the transmission method which links with the interactive service. The first information and the information which relates to the transmission method which links with the interactive service may be displayed as a popup window 521 as shown on a screen 520 of FIG. 5, but is not limited thereto. For example, the first information and the information which relates to the transmission method which links with the interactive service may be displayed as an independent window on an empty display area of the first device 110. A plurality of pieces of the information which relates to the transmission method which links with the interactive service may be displayed.

In operation S404, a user input which indicates that an information transmission request is received, and in operation S405, the first device 110 generates second information from and/or based on the first information. Operation S405 of generating the second information from and/or based on the first information is performed in the same way as operation S207 of FIG. 2B. The user input which indicates that the information transmission request is received may be based on the information displayed in operation S403. For example, when the information displayed in operation S403 is the same as that shown on the screen 520 of FIG. 5, if a user input of a selection of a message "send through SMS" is received, the first device 110 recognizes having received the user input which indicates the information transmission request.

When the plurality of pieces of the information which relates to the transmission method which links with the interactive service are displayed as described above, if the first device 110 receives a user input which relates to a selection, the first device 110 may recognize having received the information transmission request via the selected transmission method. In the screen 520 of FIG. 5, if the message "send through SMS" is selected, the first device 110 generates the second information from and/or based on the first information.

In operation S406, the first device 110 transmits the second information to the second device 130 by using the transmission method which links with the interactive service. The transmission of the second information to the second device 130 may be displayed as a screen 530 of FIG. 5, which includes a popup window 531 which indicates a completion of the transmission.

Figure 6:
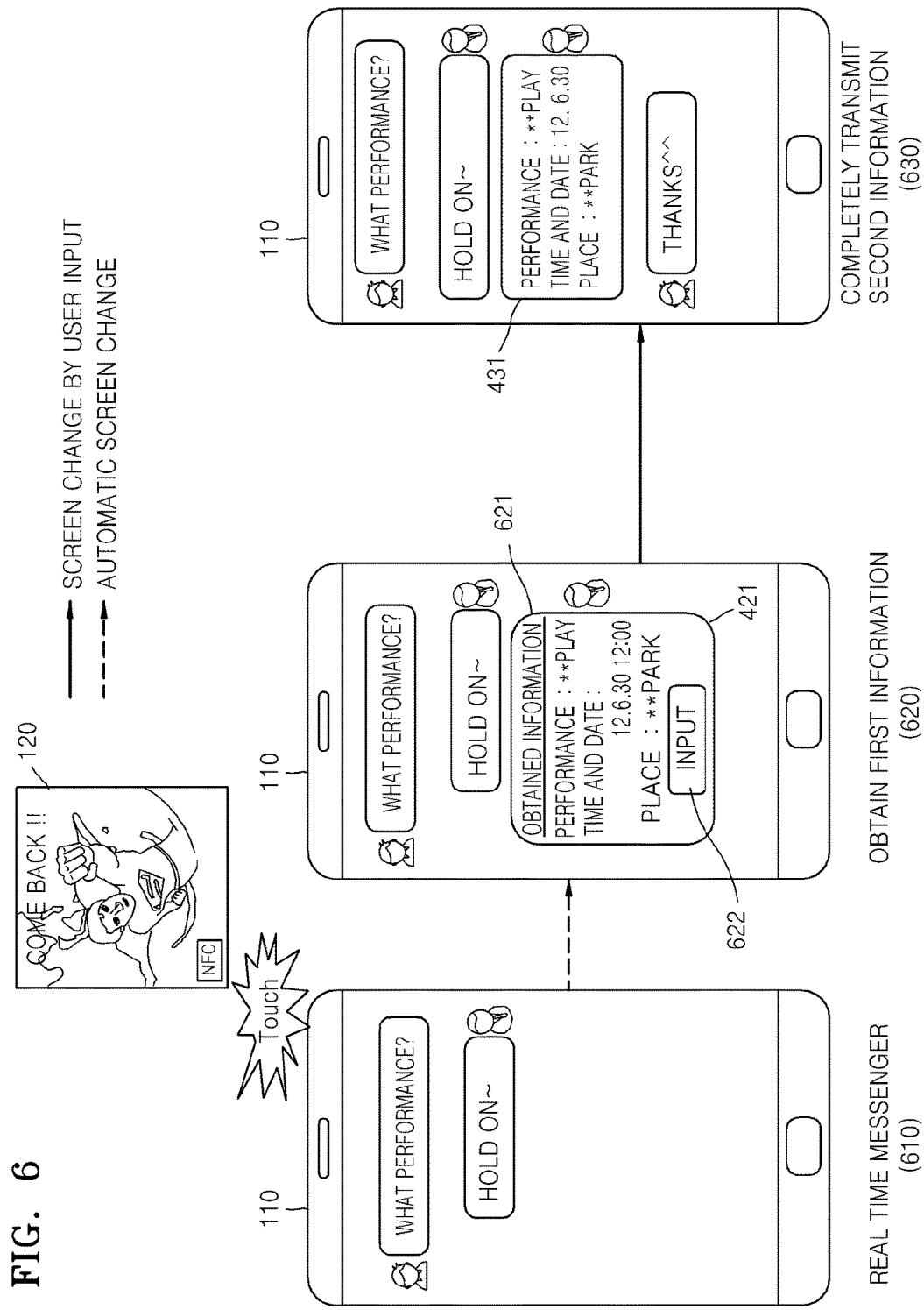
FIG. 6 shows examples of screens which are displayed on the first device when a messenger service is performed between a first device and a second device, according to another exemplary embodiment.

FIG. 6 shows examples of screens which may be displayed on the first device 110 when the interactive service between the first device 110 and the second device 130 is a messenger service, according to another exemplary embodiment.

Referring to FIG. 6, when the first device 110 displays a screen 610 in operation S401, if the first device 110 obtains first information from the object 120, the screen 610 which is displayed on the first device 110 is automatically changed to a screen 620.

If a user input of a selection of "input" is received with respect to the screen 620, the first device 110 recognizes having received a user input which indicates an information transmission request. A message 622 "input", other than information which relates to a transmission method which links with the interactive service, is included in a popup window 621 included in the screen 620 of FIG. 6, because the transmission method which links with the interactive service is the same as that of the interactive service between the first device 110 and the second device 130. However, the message displayed on the first device 110 is not limited to "input".

Figure 7:
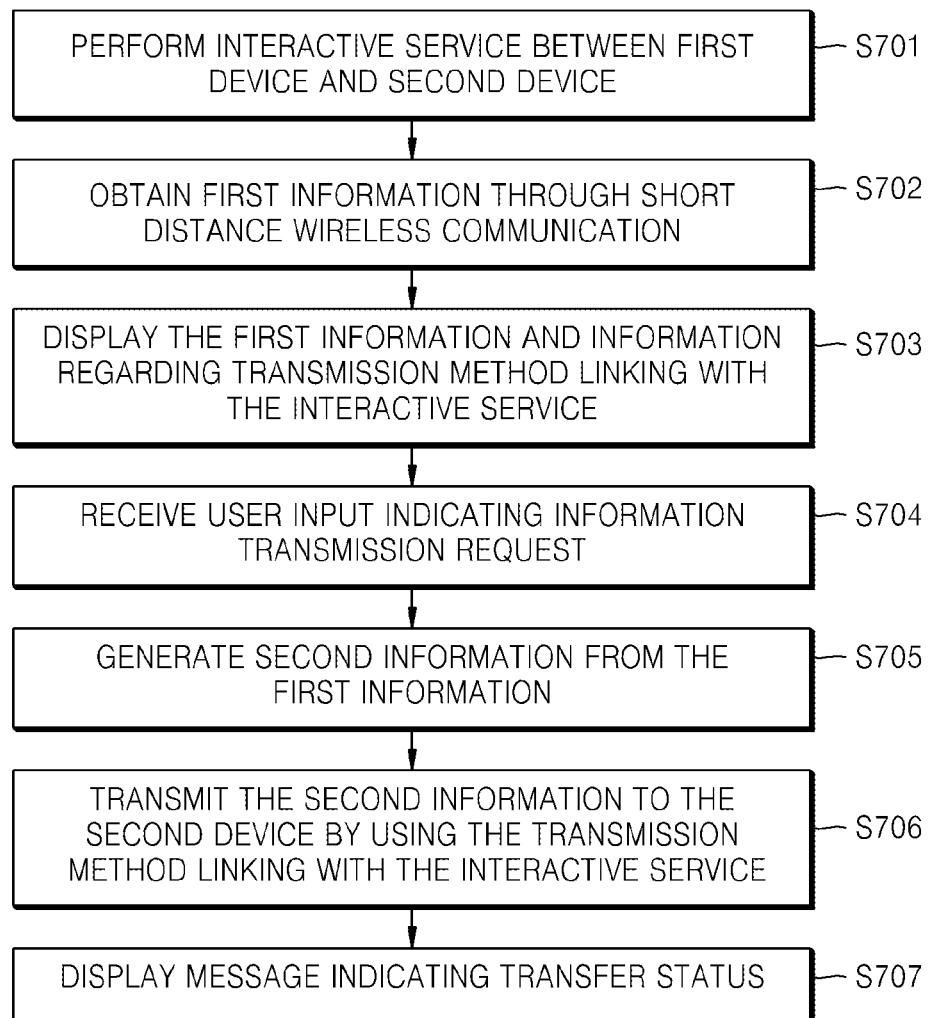
FIG. 7 is a flowchart which illustrates an information transmission method which is performable by using a first device, according to another exemplary embodiment.

FIG. 7 is a flowchart which illustrates an information transmission method which is performable by using the first device 110, according to another exemplary embodiment. The flowchart of FIG. 7 further includes an operation of displaying a message which indicates a transfer status on the first device 110, as compared to the flowchart of FIG. 4.

In operation S701, the first device 110 performs an interactive service with the second device 130. When the interactive service between the first device 110 and the second device 130 is a voice call service, the first device 110 displays the screen 510 of FIG. 5 in operation S701.

In operation S702, the first device 110 obtains the first information from the object 120. The method for obtaining the first information may be determined based on the object 120.

In operation S703, the first device 110 displays the first information and information which relates to a transmission method which links with the interactive service. The first information and the information which relates to the transmission method which links with the interactive service may be displayed as the popup window 521 as shown on a screen 520 of FIG. 5, but is not limited thereto.

In operation S704, a user input which indicates an information transmission request is received, and in operation S705, the first device 110 generates second information from and/or based on the first information. Operation S705 of generating the second information from and/or based on the first information is performed in the same way as operation S207 of FIG. 2B. The user input which indicates the information transmission request may be recognized based on a user input selecting a message "transfer through SMS" as illustrated in the screen 520 of FIG. 5, and/or based on a user input selecting a message "input" as illustrated in the screen 620 of FIG. 6 as described with reference to FIG. 4.

In operation S706, the first device 110 transmits the second information to the second device 130 by using the transmission method which links with the interactive service. Operation S706 of transmitting the second information to the second device 130 may be performed in the same way as operation S208 of FIG. 2B.

If operation S706 of transmitting the second information to the second device 130 is completely performed, in operation S707, the first device 110 displays a message which indicates the transfer status. For example, the first device 110 may display a message "transmitted" as a popup window 531 as shown on a screen 530 of FIG. 5, or may display a speech bubble 431 which includes the second information as shown on a screen 630 of FIG. 6. When the message which indicates the transfer status is displayed as shown on the screen 530 of FIG. 5, the first device 110 may flash the above-described message at predetermined time intervals until communication between the first device 110 and the second device 130 ends, or until a user requests to end displaying of the message which indicates that the transfer status is received.

Figure 8:
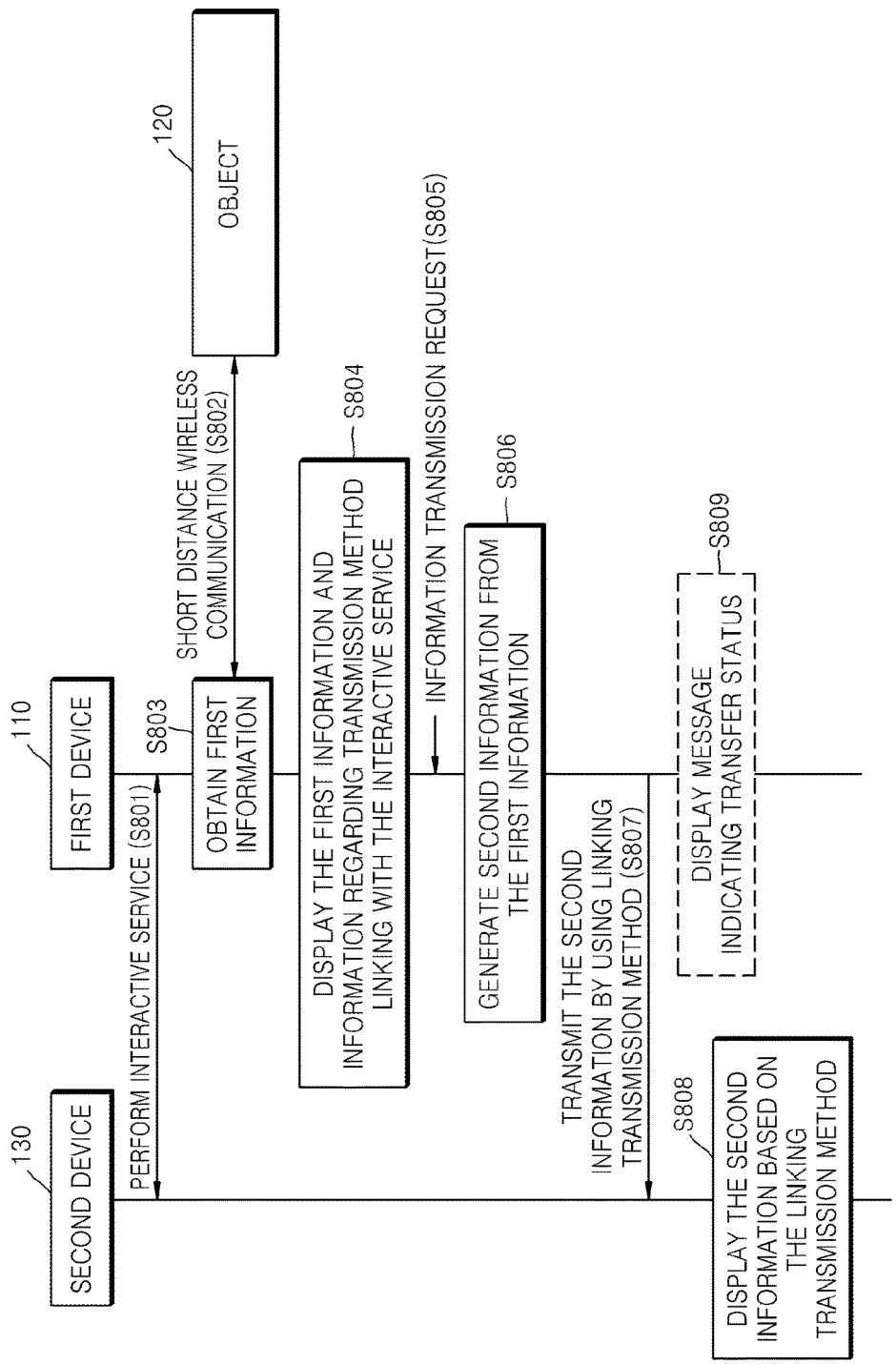
FIG. 8 is a flowchart which illustrates an information transmission method, according to another exemplary embodiment.

FIG. 8 is a flowchart which illustrates an information transmission method, according to another exemplary embodiment, for describing operations between the first device 110, the object 120, and the second device 130 when the first device 110 operates as in the flowchart of FIG. 4 and operations between the first device 110, the object 120, and the second device 130 when the first device 110 operates as in the flowchart of FIG. 7.

In operation S801, an interactive service between the first device 110 and the second device 130 is performed, and in operations S802 and S803, the first device 110 obtains first information from the object 120 based on short distance wireless communication. The first information may be information that may be collected in everyday life and/or metadata which relates to the information that may be collected as described with reference to FIG. 1.

In operation S804, the first device 110 displays the first information and information which relates to a transmission method which links with the interactive service. The first device 110 may display the information, for example, as illustrated in the popup window 521 as shown on the screen 520 of FIG. 5 or the popup window 621 as shown on the screen 620 of FIG. 6, but is not limited thereto.

In operation S805, the first device 110 receives an information transmission request signal based on the displayed first information and information which relates to the transmission method which links with the interactive service, and in operation S806, the first device 110 generates second information from and/or based on the first information. Operation S805 of receiving the information transmission request signal may be performed based on a user input of a selection of the displayed information as described with reference to FIGS. 5 and 6, but is not limited thereto. Operation S806 of generating the second information from and/or based on the first information may be performed in the same way as operation S405 of FIG. 4.

In operation S807, the first device 110 transmits the second information to the second device 130 by using the transmission method which links with the interactive service. The transmission method which links with the interactive service may be determined based on the user input of the selection of the information displayed on the screen 520 of FIG. 5 and the screen 620 of FIG. 6 as described above.

In operation S808, the second device 130 displays the second information which is received based on the transmission method which links with the interactive service of operation S801.

In operation S809, the first device 110 may display a message which indicates a transfer status.

Figure 9:
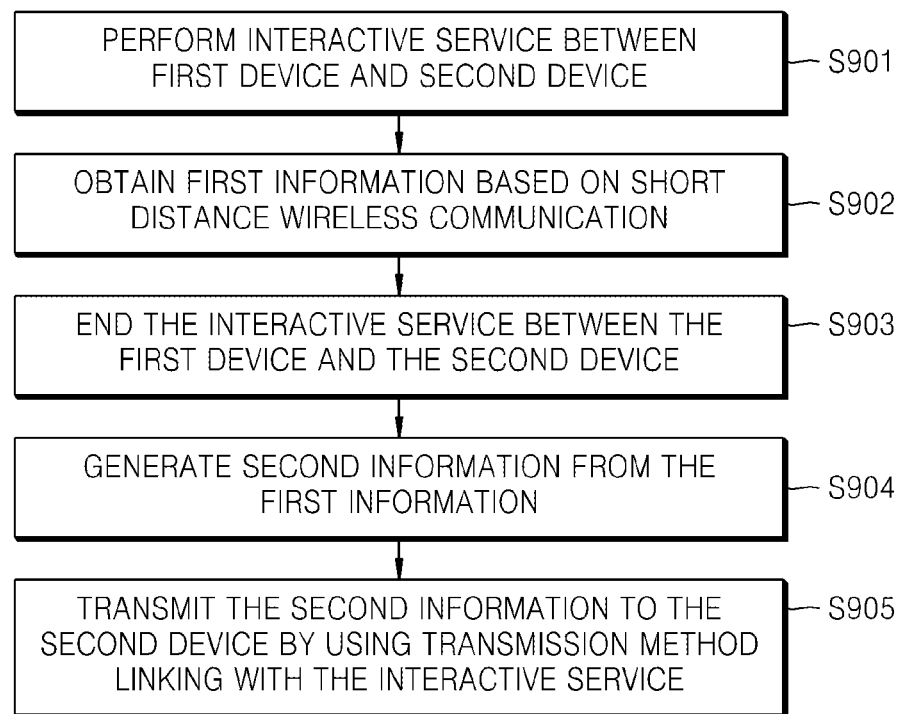
FIG. 9 is a flowchart which illustrates an information transmission method which is performable by using a first device, according to another exemplary embodiment.

FIG. 9 is a flowchart which illustrates an information transmission method which is performable by using the first device 110, according to another exemplary embodiment. The flowchart of FIG. 9 shows a case where the first device 110 generates and transmits second information from and/or based on first information to the second device 130 after communication between the first device 110 and the second device 130 ends.

In operation S901, the first device 110 performs an interactive service with the second device 130. In operation S902, the first device 110 obtains the first information from the object 120 based on short distance wireless communication.

In operation S903, the first device 110 ends the interactive service with the second device 130. In operation S904, the first device 110 generates the second information from and/or based on the first information. In operation S905, the first device 110 transmits the second information to the second device 130 by using a transmission method which links with the interactive service. In this case, the linking transmission method is different from a transmission method of the interactive service between the first device 110 and the second device 130. For example, the interactive service of operation S901 may be a voice call service or a video call service, and the transmission method linking with the interactive service of operation S905 may be SMS/MMS. The transmission method which links with the interactive service used in operation S905 may be previously set based on the interactive service between the first device 110 and the second device 130 of operation S901, but is not limited thereto. In particular, the linking transmission method may be determined based on a type of the first information and the interactive service.

FIG. 10 is a flowchart which illustrates an information transmission method, according to another exemplary embodiment, to describe operations between the first device 110, the object 120, and the second device 130 when the first device 110 operates as in the flowchart of FIG. 9.

In operation S1001, the first device 110 and the second device 130 perform an interactive service, and in operations S1002 and S1003, the first device 110 obtains the first information from the object 120 based on short distance wireless communication. The first information may be information that may be collected in everyday life and/or metadata which relates to the information that may be collected as described above with reference to FIG. 1.

In operation S1004, the first device 110 ends the interactive service with the second device 130. In operation S1005, the first device 110 generates the second information from and/or based on the first information. In operation S1006, the first device 110 transmits the second information to the second device 130 by using a transmission method which links with the interactive service. In operation S1007, the second device 130 displays the second information which is received based on the transmission method which links with the interactive service.

Figure 11A:
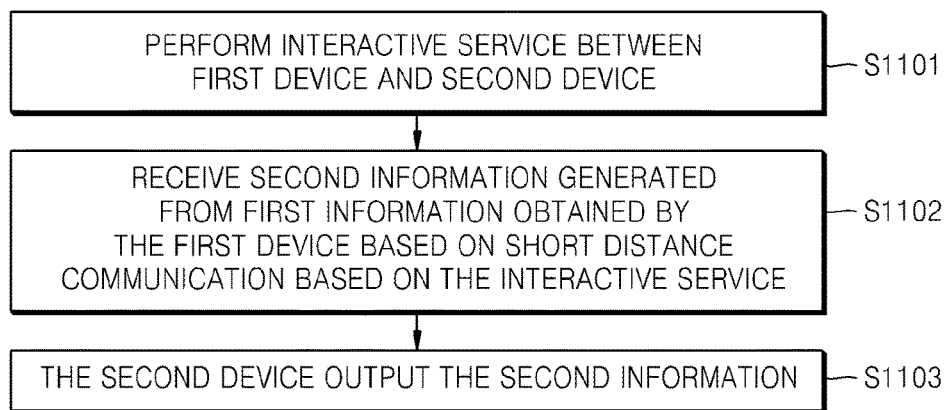
FIG. 11A is a flowchart which illustrates an information transmission method which is performable by using a second device, according to an exemplary embodiment.

FIG. 11A is a flowchart which illustrates an information transmission method which is performable by using the second device 130, according to an exemplary embodiment.

In operation S1101, the second device 130 performs an interactive service with the first device 110. In operation S1102, the second device 130 receives second information which is generated from and/or based on first information obtained based on short distance wireless communication by the first device 110 based on the interactive service. In operation S1103, the second device 130 outputs the second information via the interactive service.

Figure 11B:
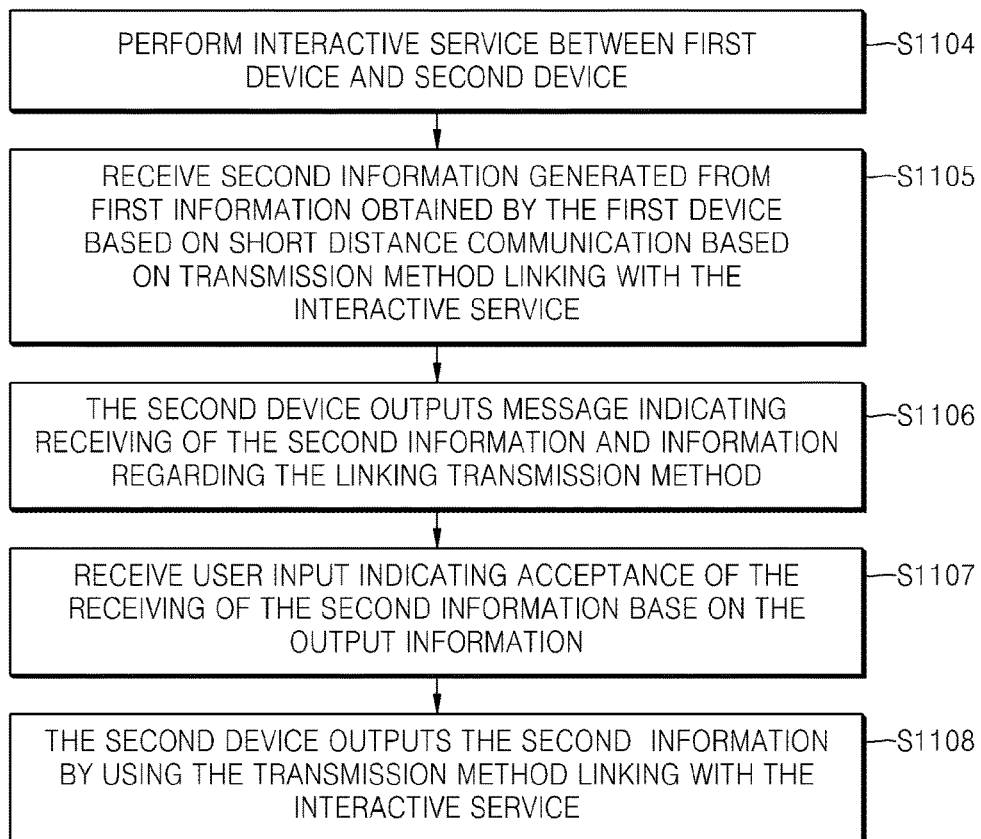
FIG. 11B is a flowchart which illustrates an information transmission method which is performable by using a second device, according to another exemplary embodiment.

FIG. 11B is a flowchart which illustrates an information transmission method which is performable by using the second device 130, according to another exemplary embodiment.

In operation S1104, the second device 130 performs an interactive service with the first device 110. In operation S1105, the second device 130 receives second information which is generated from and/or based on first information obtained based on short distance wireless communication by the first device 110 by using a transmission method which links with the interactive service. The transmission method which links with the interactive service is determined by the first device 110.

In operation S1106, the second device 130 outputs a message which indicates a reception of the second information and information which relates to the linking transmission method. The information which relates to the linking transmission method may be displayed on the second device 130, and/or may be output as an audio signal. When the information which relates to the linking transmission method is displayed, the second device 130 may display the information which relates to the linking transmission method as illustrated in the popup window 521 as shown on the screen 520 of FIG. 5 or the popup window 621 as shown on the screen 620 of FIG. 6.

In operation S1107, the second device 130 receives a user input which indicates an acceptance of the receiving of the second information based on the output information. The user input may be a selection of a message which corresponds to a linking transmission method message 522 included in the popup window 521 of the screen 520 of FIG. 5, or a selection of a message which corresponds to the message "input" 622 included in the popup window 621 of the screen 620 of FIG. 6. In operation S1108, the second device 130 outputs the second information by using the transmission method which links with the interactive service.

The flowcharts of the second device 130 shown in FIGS. 11A and 11B may be applied to the flowchart of the second device 130 shown in FIGS. 3 and 8, respectively.

Figure 12:
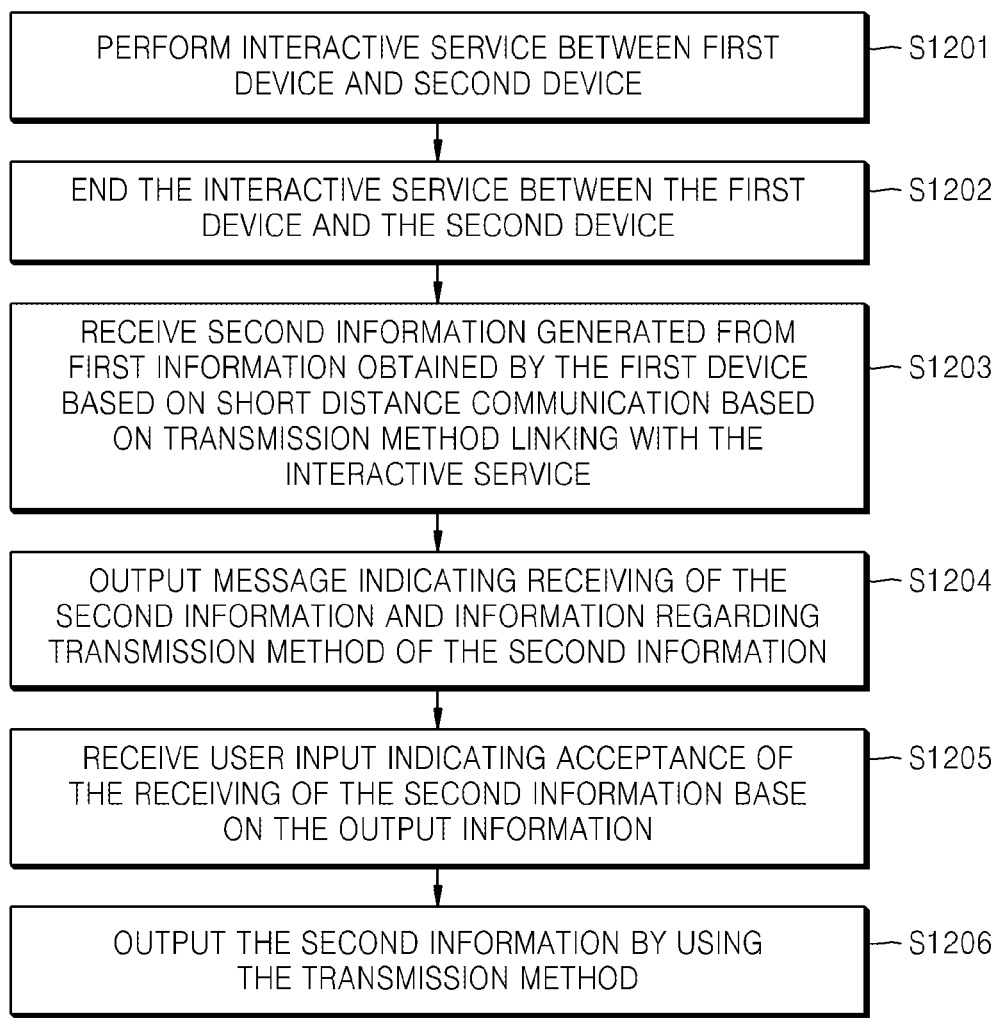
FIG. 12 is a flowchart which illustrates an information transmission method which is performable by using a second device, according to another exemplary embodiment.

FIG. 12 is a flowchart which illustrates an information transmission method which is performable by using the second device 130, according to another exemplary embodiment. The flowchart of FIG. 12 shows a case in which the second device 130 receives second information which is generated from and/or based on first information obtained by the first device 110 after an interactive service between the first device 110 and the second device 130 ends.

In operation S1201, the second device 130 performs the interactive service with the first device 110. In operation S1202, the second device 130 ends the interactive service with the first device 110.

In operation S1203, the second device 130 receives the second information which is generated from and/or based on the first information obtained based on short distance wireless communication by the first device 110 via a transmission method which links with the interactive service. The transmission method which links with the interactive service is determined by the first device 110.

In operation S1204, the second device 130 outputs a message which indicates a reception of the second information and information which relates to the linking transmission method. The information which relates to the linking transmission method may be displayed on the second device 130 and/or may be output as an audio signal. When the information which relates to the linking transmission method is displayed, the second device 130 may display the information which relates to the linking transmission method as illustrated by the popup window 521 as shown on the screen 520 of FIG. 5 or the popup window 621 as shown on the screen 620 of FIG. 6.

In operation S1205, the second device 130 receives a user input which indicates an acceptance of the receiving of the second information based on the output information. The user input may be a selection of a message which corresponds to the linking transmission method message 522 included in the popup window 521 of the screen 520 of FIG. 5 or a selection of a message which corresponds to the message "input" 622 included in the popup window 621 of the screen 620 of FIG. 6. In operation S1206, the second device 130 outputs the second information by using the transmission method which links with the interactive service.

The flowchart of the second device 130 shown in FIG. 12 may be applied to the flowchart of the second device 130 shown in FIG. 10.

Figure 13:
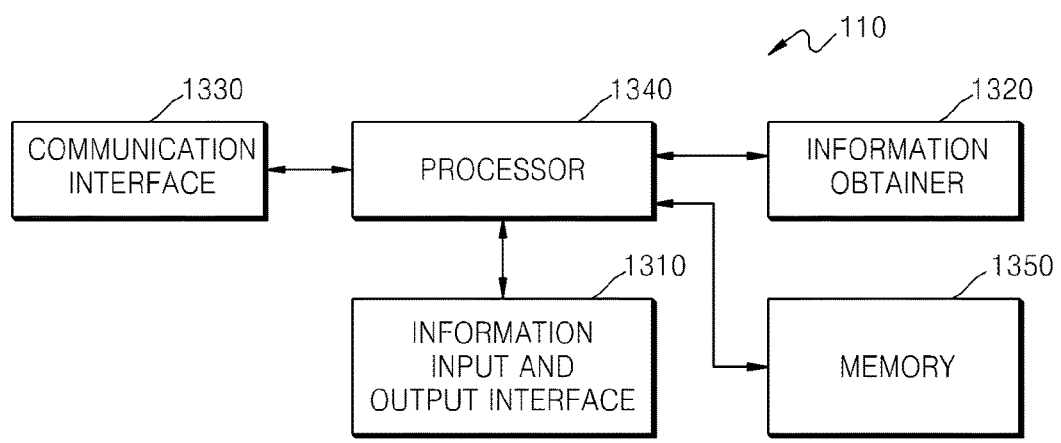
FIG. 13 is a block diagram of an example of a first device, according to an exemplary embodiment.

FIG. 13 is a block diagram of an example of the first device 110, according to an exemplary embodiment. Referring to FIG. 13, the first device 110 includes an information input and output interface 1310, an information obtainer 1320, a communication interface 1330, a processor 1340, and a memory 1350, but is not limited thereto. In particular, the first device 110 may include additional constituent elements as compared with those shown in FIG. 13. The information input and output interface 1310 may be referred to as an information input and output unit or an information input and output module. The information obtainer 1320 may be referred to as an information obtaining unit or an information obtaining module. The communication interface 1330 may be referred to as a communication unit or a communication module.

The information input and output interface 1310 receives a user input and outputs output information from the first device 110. For example, the user input may include any one or more of a touch based input, a physical button control based input, a user gesture based input, a user voice recognition based input, a face recognition based input, and a remote controller (not shown) based input, but is not limited thereto.

The information input and output interface 1310, according to an exemplary embodiment, may display screens as shown in FIGS. 5 and 6 and receive an information transmission request signal.

The information input and output interface 1310 may include any one or more of a dial, a slider switch, a joystick, a click wheel, a touch pad, a touch screen, a microphone, a speaker, sensors, a display light, a key pad, a display device, a scroll wheel, and a wireless communication based remote signal receiver, and/or any other suitable input mechanism, but is not limited thereto.

The information obtainer 1320 obtains information from a peripheral object based on short distance communication. The information obtainer 1320 is configured to obtain the information based on at least one of NFC-based short distance wireless communication, RFID-based short distance wireless communication, BLE-based short distance wireless communication, and a barcode or QR code recognition-based technology.

To this end, the information obtainer 1320 may include an NFC-based communication module, an RFID-based communication module, a BLE-based communication module, and a barcode or QR code recognition-based module, but is not limited thereto. In particular, the information obtainer 1320 may not include a part of the above-described modules.

The NFC-based communication module may be configured to read/write via NFC when the object 120 outside is an NFC-based tag, but is not limited thereto. Accordingly, when a distance between the first device 110 and the object 120 is within an NFC-based communication range (for example, 10 cm~20 cm), the information obtainer 1320 may read or receive information which is stored in the object 120.

When the object 120 outside is an RFID-based tag, the RFID-based communication module may be configured as an RFID reader, but is not limited thereto. Accordingly, when the distance between the first device 110 and the object 120 is within an RFID recognition distance range, the information obtainer 1320 may receive the information which is stored in the object 120. The RFID recognition distance may be variably based on a type of the RFID based tag.

When the object 120 outside is a BLE module, the BLE based communication module may be configured as a Bluetooth module for receiving a signal which is broadcasted by BLE, but is not limited thereto. Accordingly, when the distance between the first device 110 and the object 120 is within a distance range at which the signal broadcasted by BLE may be received, the information obtainer 1320 may receive the information which is stored in the object 120.

When the object 120 outside is configured as a code such as a barcode or a QR code, the barcode or QR code recognition-based module may be configured as a barcode scanner or a QR code scanner or an application corresponding thereto, but is not limited thereto. When the information obtainer 1320 is configured as the barcode scanner or the QR code scanner or the application corresponding thereto, the information obtainer 1320 may operate based on a user input which is received by the information input and output interface 1310.

The communication interface 1330 may communicate with the second device 130 and/or with the server 140 over the network 150. The communication interface 1330 may perform, for example, an interactive service such as any one or more of a messenger service, a message service, an e-mail service, a video call service, and a voice call service with the second device 130, but is not limited thereto. The communication interface 1330 may perform the interactive service via communication other than short distance communication. The communication other than short distance communication may be one or more of, for example, WiFi communication using an access point (AP), 3G communication, and 4G LTE communication, but is not limited thereto. When the information obtainer 1320 obtains first information that is metadata, the communication interface 1330 may be controlled by the processor 1340, used for transmitting a request that the server 140 send original information based on the metadata, and used for receiving the original information from the server 140.

The communication interface 1330 may transmit second information which is generated from and/or based on the first information obtained by the information obtainer 1320 to the second device 130 via a transmission method which links with the above-described interactive service while performing the interactive service with the second device 130 over the network 150. The communication interface 1330 may convert a data format of the second information and transmit the second information by using the transmission method which links with the interactive service. However, the data format of the second information may be converted by the processor 1340.

The processor 1340 executes at least one program for performing the information transmission method which is stored in the memory 1350, according to an exemplary embodiment.

In particular, the processor 1340 may execute the program and control a first information obtaining operation which is performed by the information obtainer 1320, a second information transmission operation which is performed by the communication interface 1330, and an information input and output operation which is performed by the information input and output interface 1310 while performing the interactive service with the second device 130 via the communication interface 1330, but is not limited thereto.

When the first device 110 and the second device 130 perform the interactive service, if the first information is obtained by the information obtainer 1320, the processor 1340 generates the second information from and/or based on the first information as described above with reference to FIG. 1. The processor 1340 may transmit the second information to the second device 130 via the communication interface 1330 based on the interactive service.

The processor 1340 may transmit the second information by using the above-described transmission method which links with the interactive service. In particular, the processor 1340 displays information which relates to the transmission method which links with the interactive service and the first information via the information input and output interface 1310 as shown on the screen 520 of FIG. 5 or the screen 620 of FIG. 6. The information which relates to the transmission method which links with the interactive service may be previously stored in the memory 1350. The previously stored information which relates to the transmission method which links with the interactive service follows the interactive service between the first device 110 and the second device 130. When a transmission of the first information is requested based on the information displayed on the information input and output interface 1310, the processor 1340 generates the second information from and/or based on the first information, and controls the communication interface 1330 to convert a data formation of the second information and to transmit the second information to the second device 130 by using the transmission method which links with the interactive service.

The processor 1340 may display a message which indicates a transfer status via the information input and output interface 1310 after transmitting the second information to the second device 130.

Meanwhile, after ending the interactive service between the first device 110 and the second device 130, the processor 1340 may generate the second information from and/or based on the first information and then transmit the second information by using the transmission method which links with the interactive service.

The memory 1350 may store the above-described at least one program, the information which relates to the transmission method which links with the interactive service, communication applications relating to various interactive services that are to be performed by the first device 110, and at least one application for recognizing a barcode or a QR code, but is not limited thereto. The memory 1350 may include at least one type of storage medium, such as a flash memory type, a hard disk type, a multimedia card micro type, a card type memory (for example, SD, XD memory, etc.), read only memory (ROM), electronically erasable programmable ROM (EEPROM), programmable ROM (PROM) magnetic memory, and an optical disk.

Figure 14:
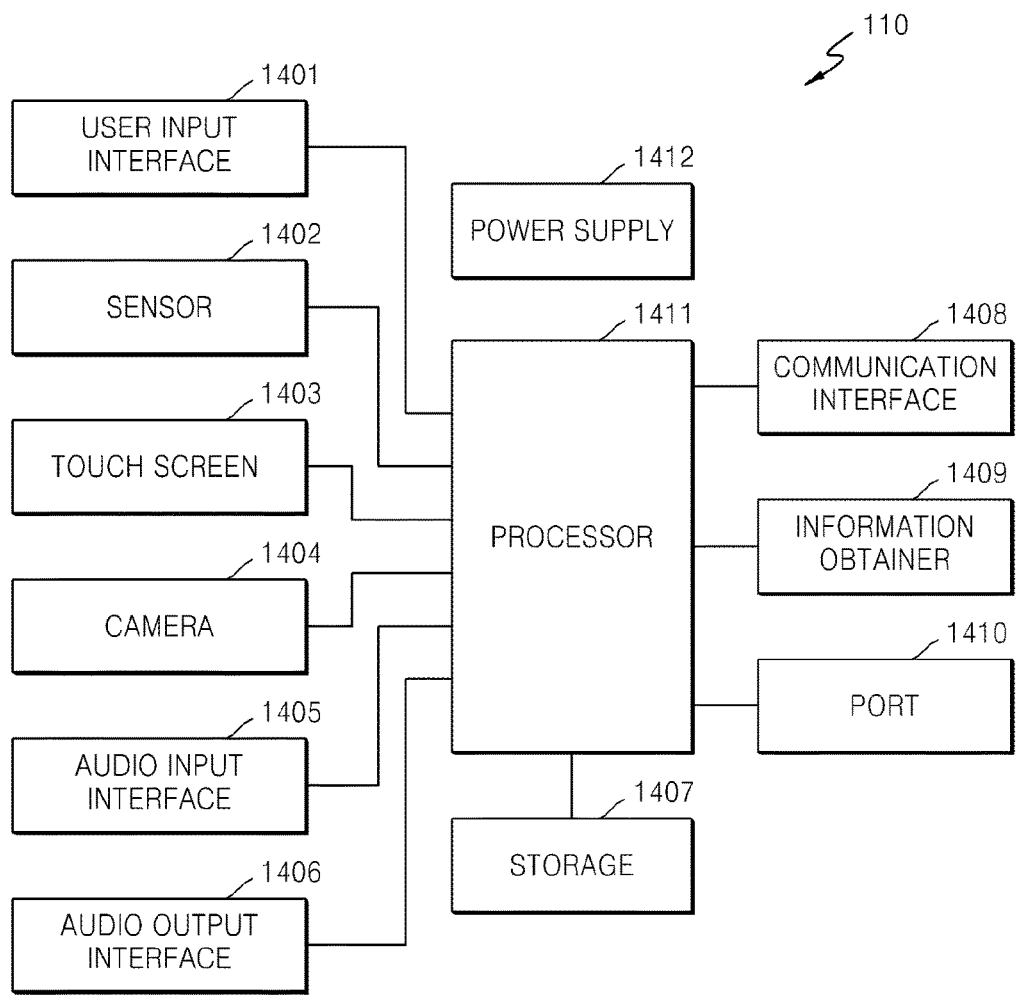
FIG. 14 is a block diagram of another example of a first device, according to an exemplary embodiment.

FIG. 14 is a block diagram of another example of the first device 110, according to an exemplary embodiment. Referring to FIG. 14, the first device 110 includes a user input interface 1401, a sensor 1402, a touch screen 1403, a camera 1404, an audio input interface 1405, an audio output interface 1406, storage 1407, a communication interface 1408, an information obtainer 1409, a port 1410, a processor 1411, and a power supply 1412, but is not limited thereto. In particular, the first device 110 may include greater or lesser constituent elements than those shown in FIG. 14.

The user input interface 1401 may be referred to as a user input unit or a user input module. The sensor 1402 may be referred to as a sensing unit or a sensing module. The audio input interface 1405 may be referred to as an audio input unit or an audio input module. The audio output interface 1406 may be referred to as an audio output unit or an audio output module. The communication interface 1408 may be referred to as a communication unit or a communication module.

The user input interface 1401 generates input data (or control data) for controlling an operation of the first device 110 and the above-described user input information. The user input interface 1401 may include any one or more of a key pad, a dome switch, a touch pad replacing a mouse, a jog wheel, a jog switch, a hardware button, and/or any other suitable input mechanism.

The sensor 1402 senses a current status of the first device 110, such as, for example, any one or more of a location of the first device 110, whether there is any user contact, an orientation of the first device 110, an acceleration or deceleration of the first device 110, and/or any other suitable status-related information, and generates a sensing signal for controlling the operation of the first device 110. The sensor 1402 may include a proximity sensor and the above-described motion sensor. Thus, the sensor 1402 may generate a signal that recognizes a sensor-based user gesture.

The proximity sensor is a sensor for detecting whether an object approaches a previously set detection surface and/or whether the object is present nearby by using a force of an electromagnetic field and/or an infrared ray without any actual physical touch. Examples of the proximity sensor include a transparent photoelectric sensor, a direct reflective photoelectric sensor, a mirror reflective photoelectric sensor, a high frequency oscillation photoelectric sensor, a capacitive photoelectric sensor, a magnetic photoelectric sensor, an infrared photoelectric sensor, and/or any other suitable type of sensor.

A touch screen 1403 based user input information may be generated based on a user request or a user selection that depends on the above-described user gesture. The user gesture may be defined as various combinations of a touch frequency, a touch pattern, a touch area, and a touch intensity. A user's finger based touch on the touch screen 1403 may be understood based on a body part of a user that may touch a touch region of the touch screen 1403.

The touch screen 1403 may include any one or more of various sensors for sensing a touch or proximity touch thereto. Sensors included in the touch sensor 1503 are sensors that sense user gestures or patterns on the touch screen 1403. Thus, the touch screen 1403 may generate signals that sense the above-described touch based drag, flick, tap, touch and hold, double tap, panning, sweep, and swipe, and proximity sensor based user gestures or patterns. A proximity sensor for the touch screen 1403 may be the same as the proximity sensor included in the sensor 1402.

An example of the sensor for sensing the touch of the touch screen 1403 may include a tactile sensor. The tactile sensor may sense any one or more of various types of information, such as roughness of a touch surface, hardness of a touch object, a temperature at a touch point, and/or any other suitable type of touch-based information. The touch of the touch screen 1403 may include a pointer touching a touch panel. The touch may include a multi-touch. A proximity touch of the touch screen 1403 occurs when the pointer does not actually touch the touch screen 1403 but approaches the touch screen 1403 to within a predetermined distance. Examples of the pointer may include a stylus pen, a user's finger, and/or any other suitable object or body part which may be used to apply a touch to the touch screen 1403. Thus, the pointer may be referred to as an external input apparatus.

The touch screen 1403 displays information which is processed by the first device 110. For example, the touch screen 1403 displays user gestures or touch patterns which are sensed by a sensor included in the touch screen 1403, control data or user input information which is received via the user input interface 1401 or a screen which responds to a signal which is sensed by the sensor 1402.

The touch screen 1403 may be referred to as an input and output apparatus. When the touch screen 1403 is the input and output apparatus, a screen which is displayed on the touch screen 1403 may include a user interface (UI) or a graphical UI (GUI). The touch screen 1403 may display an image of reproduced content and may receive the user input information. The touch screen 1403 may also display information which is based on the interactive service between the first device 110 and the second device 130, according to an exemplary embodiment. For example, the touch screen 1403 may display screens as shown in FIGS. 5 and 6.

The touch screen 1403 may include any one or more of a liquid crystal display (LCD), a thin film transistor liquid crystal display (TFT-LCD), an organic light-emitting diode (OLED), a flexible display, a 3D display, and an active matrix OLED (AM OLED), but is not limited thereto. The touch screen 1403 may be referred to as a display. There may be two or more touch screens 1403, based on an implementation form of the first device 110.

The camera 1404 processes an image frame, such as, for example, a still image or a moving image obtained by an image sensor (or a photo sensor), in a conference call mode or a photographing mode. The processed image frame may be displayed on the touch screen 1403. The image frame processed by the camera 1404 may be stored in the storage 1407 or transmitted to the outside via the communication interface 1408 or the port 1410. The camera 1404 may be linked with the information obtainer 1409 via the processor 1411 when the information obtainer 1409 is configured based on a barcode or QR code recognition.

There may be two or more cameras 1404, based on the construction of the first device 110. The camera 1404 may be used as an input apparatus for recognizing a user space gesture. The image frame which is obtained by the camera 1404 may be a user image which is generated based on a bidirectional communication service, according to an exemplary embodiment.

The audio input interface 1405 may receive an input of an external acoustic signal in a call mode, a recording mode, or a voice recognition mode, convert the acoustic signal to electrical voice data, and transmit the electrical voice data to the processor 1411. The audio input interface 1405 may be configured as, for example, a microphone. The audio input interface 1405 may be configured to include diverse noise removal algorithms for removing noise which is generated during a process for receiving the input of the external acoustic signal.

The acoustic signal which is received by using the audio input interface 1405 may be a spoken language-based user input information for the interactive service according to an exemplary embodiment and content sharing. For example, a content-related information obtaining command may be received via the audio input interface 1405. The spoken language based user input information may be input based on voice recognition technique. The external acoustic signal which is received via the audio input interface 1405 may be stored in the storage 1407 or transmitted to the outside via the communication interface 1408 or the port 1410.

The audio output interface 1406 outputs the acoustic signal or an audio signal that is received from the outside in the call mode or an audio reproduction mode. The audio output interface 1406 may be configured as a speaker. If an audio signal is included in content when the content is reproduced, the audio output interface 1406 outputs the audio signal included in the reproduced content. The audio input interface 1405 and the audio output interface 1406 may be integrally formed within a head set.

The storage 1407 stores at least one program and/or a command set and a resource that are configured to be executed in the processor 1411 that will be described below. The at least one program includes at least one program for executing the information transmission method according to an exemplary embodiment, an operating system program of the first device 110, an application program which is related to diverse functions performed by the first device 110, and a program for driving hardware components included in the first device 110.

The resource may include information which relates to a transmission method which links with the interactive service performed between the first device 110 and the second device 130 according to an exemplary embodiment. The information which relates to the transmission method which links with the interactive service is the same as described above with reference to FIG. 1. Further, the resource may further include user information which relates to the first device 110, information which relates to managing the application program set in the first device 110, and information which relates to executing the program for driving the above hardware components, but is not limited thereto.

The storage 1407 may include at least one type of storage medium, such as a flash memory type, a hard disk type, a multimedia card micro type, a card type memory (for example, SD, XD memory, etc.), ROM, EEPROM, PROM magnetic memory, and an optical disk.

The at least one program and/or the command set that are stored in the storage 1407 may be classified as a plurality of modules according to functions.

Figure 15:
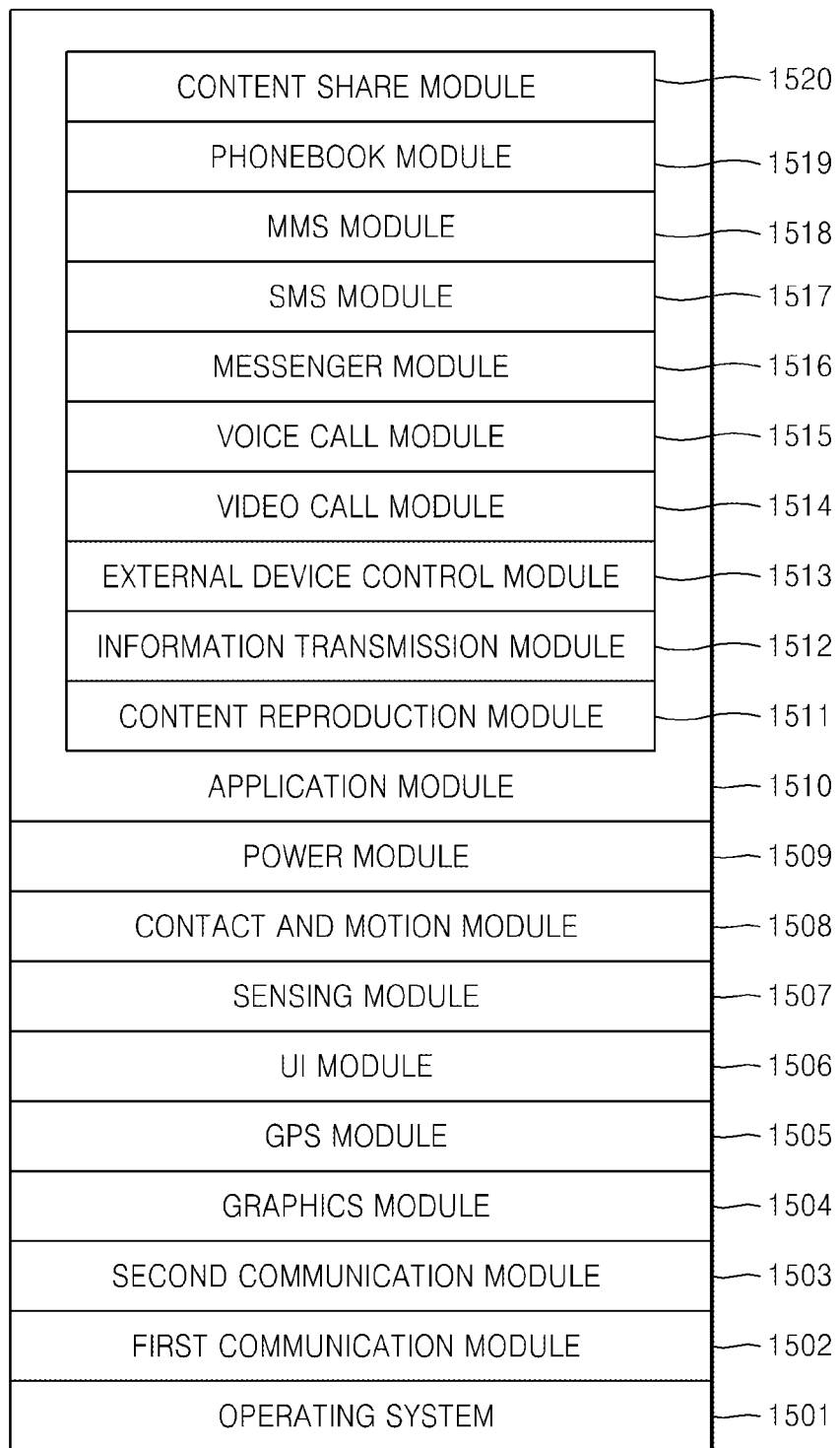
FIG. 15 shows an example of programs and/or command sets that are stored in a storage unit of FIG. 14.

FIG. 15 shows an example of programs and/or command sets that are stored in the storage 1407 and classified according to modules. Referring to FIG. 15, the storage 1407 includes an operating system 1501, a first communication module 1502, a second communication module 1503, a graphics module 1504, a global positioning system (GPS) module 1505, a user interface (UI) module 1506, a sensing module 1507, a contact and motion module 1508, a power module 1509, and an application module 1510, but is not limited thereto.

The application module 1510 includes a content reproduction module 1511, an information transmission module 1512, an external device control module 1513, a video call module 1514, a voice call module 1515, a messenger module 1516, an SMS module 1517, an MMS module 1518, a phonebook module 1519, and a content share module 1520, but is not limited thereto. For example, the application module 1510 may further include any one or more of various modules, such as, for example, an e-mail module, an SNS module, a video conference module, an image management module, a browsing module, a calendar module, a widget module, a search module, and a word processing module.

The operating system 1501 controls and manages a general function of the first device 110 and includes a software component for enabling communication between hardware and software components included in the first device 110.

The first communication module 1502 enables communication with the second device 130 and the service 140 via the communication interface 1408, and includes a software component for processing data received from and transmitted to the second device 130 and the service 140 via the communication interface 1408. The first communication module 1502 may transmit second information which is generated from and/or based on first information obtained from a peripheral object of the first device 110 by using a transmission method which links with an interactive service when performing the interactive service with the second device 130.

The second communication module 1503 enables communication with an external device (not shown) via the port 1410, and includes a software component for processing data received from and transmitted to the external device (not shown) via the port 1410.

The graphics module 1504 includes a software component for brightness adjustment and rendering of graphics which are displayed on the touch screen 1403 and a software component for providing a virtual keyboard (or a soft keyboard) for inputting text in the application module 1510.

The GPS module 1505 includes a software component for determining a location of the first device 110 and providing the determined location to an application that provides a location-based service.

The UI module 1506 includes a software component for providing a UI which may be used in conjunction with an application that provides touch screen 1403 based UI information.

The sensing module 1507 includes a software component for determining sensing information based on the sensor 1402 and providing a service based on the determined sensing information to the application module 1510.

The contact and motion module 1508 includes a software component for detecting the touch screen 1403 based touch contact, tracking a contact based motion, and providing the tracked motion to the application module 1409.

The power module 1509 includes a software component for linking with the operating system 1501, controlling a power supply that supplies power to hardware components included in the first device 110, and controlling a sleep mode with respect to power which is supplied to the touch screen 1403.

Functions of the modules included in the application module 1510 may be intuitively inferred by one of ordinary skill in the art from their titles, and thus only the application module 1409 which is related to an exemplary embodiment.

For example, when the first device 110 performs a voice call service with the second device 130 by executing the voice call module 1514, the first device 110 obtains first information from the object 120 by executing the information transmission module 1512 and generates the second information from and/or based on the first information. The first device 110 transmits the second information to the second device 130 via the communication interface 1408 by using a transmission method which links with the voice call service.

The storage 1407 may not store the modules included in the application module 1510 among the program and/or command set of FIG. 15, or may store only location information, such as, for example, a URL of the application module 1510 and display information which indicates the application module 1510. When the modules included in the application module 1510 are not stored in the storage 1407, the processor 1411 may be connected to the server 140 via the communication interface 1408 and may use a program and/or a command set which corresponds to the application module 1510 stored in the server 140.

When only the location information such as a URL of the application module 1510 and the display information which indicates the application module 1510 are stored in the storage 1407, the processor 1411 may use a program and/or a command set of an application which is selected by a user and stored in the server 140 via the communication interface 1408 by using location information of the application which corresponds to a user selection signal based on the display information of the application module 1510 which is displayed on the touch screen 1403.

The communication interface 1408 may transmit and receive data to and from the second device 130 and the server 140 over a wireless network which may include any one or more of wireless Internet, wireless Intranet, a wireless phone network, a wireless LAN, a Wi-Fi network, a WFD network, a 3G network, a 4G LTE network, a Bluetooth network, an IrDA network, a RFID network, a UWB network, and a Zigbee network, or a wired network which may include wired Internet.

The communication interface 1408 may include at least one of a broadcasting reception module, a mobile communication module, a wired Internet module, a short distance communication module, and a location information module, but is not limited thereto.

The information obtainer 1409 may be configured in the same way as the information obtainer 1320 of FIG. 13.

The port 1410 may transmit and receive data to and from an external device (not shown) by using a plug and play interface, such as, for example, a universal serial bus (UBS) port (not shown). The port 1410 may not be included in the constituent elements of the first device 110.

The power supply 1412 supplies power to a hardware component which is included in the first device 110. The power supply 1412 includes one or more power sources, such as, for example, any one or more of a battery and an alternating current (AC) power source. The first device 110 may not include the power supply 1412 but may include a connection unit (not shown) that may be connected to an external power supply (not shown).

The processor 1411 may be referred to as one or more processors that control a general operation of the first device 110. The processor 1411 may generally control the user input interface 1401, the sensor 1402, the touch screen 1403, the camera 1404, the audio input interface 1405, the audio output interface 1406, the storage 1407, the communication interface 1408, the information obtainer 1409, the port 1410, and the power supply 1412 by using the operating system 1501 and the modules 1502 through 1520 which are included in the storage 1407. Thus, the processor 1411 may be referred to as a controller, a microprocessor, or a digital signal processor.

The processor 1411 may also provide a user interface via the user input interface 1401, the sensor 1402, the touch screen 1403, the camera 1404, and the audio input interface 1405 by using the operating system 1501 and the UI module 1506.

The processor 1411 may execute at least one program which is related to the information transmission method according to an exemplary embodiment and thereby perform one of the methods as shown in the flowcharts of FIGS. 2A, 2B, 7, and 9. The processor 1411 may execute the program by reading the program from the storage 1407 or by downloading the program from the server 140 which is connected via the communication interface 1408. In this regard, the server may be referred to as an application providing server or an application market server. The processor 1411 may be understood to include an interface function unit which provides an interface between various hardware components of the first device 110 and the processor 1411.

Figure 16:
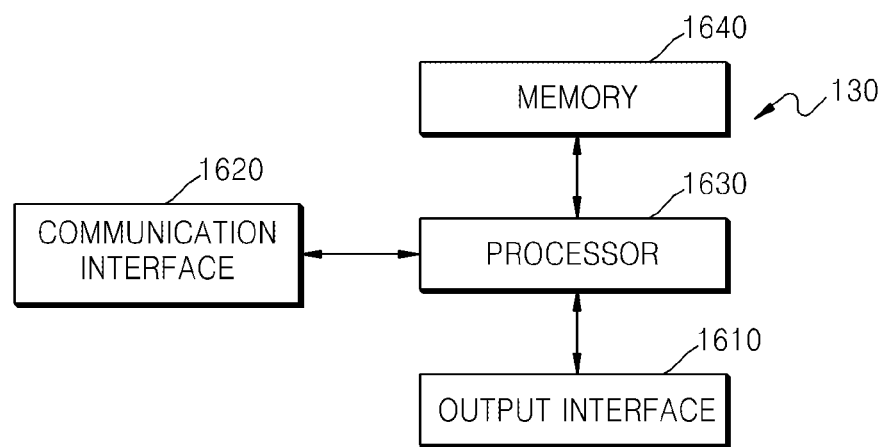
FIG. 16 is a block diagram of an example of a second device, according to an exemplary embodiment.

FIG. 16 is a block diagram of an example of the second device 130, according to an exemplary embodiment. Referring to FIG. 16, the second device 130 includes an information input and output interface 1610, a communication interface 1620, a processor 1630, and a memory 1640, but is not limited thereto. In particular, the second device 130 may include greater or lesser constituent elements than those shown in FIG. 16. The information input and output interface 1610 may be referred to as an information input and output unit or an information input and output module. The communication interface 1620 may be referred to as a communication unit or a communication module.

The information input and output interface 1610 receives a user input and outputs output information from the second device 130. For example, as described above, the user input may include any one or more of a touch based input, a physical button control based input, a user gesture based input, a user voice recognition based input, a face recognition based input, and a remote controller (not shown) based input, but is not limited thereto.

The information input and output interface 1610, according to an exemplary embodiment, may output a message which indicates the reception of second information via the communication interface 1620 and information which relates to a transmission method which links with an interactive service, similarly as illustrated by the popup window 521 or 621 of FIG. 5 or 6. The information input and output interface 1610 may receive a user input which indicates acceptance of the reception of the second information from the first device 110 based on the output message and information. The information input and output interface 1610 may output the received information by using the transmission method which links with the interactive service via the communication interface 1620, but is not limited thereto.

In particular, the information input and output interface 1610 may output only the message which indicates the reception of the second information. If the information input and output interface 1610 receives the user input which indicates acceptance of the reception of the second information based on the output message, the information input and output interface 1610 may output the second information which is received based on the interactive service with the first device 110.

The information input and output interface 1610 may include any one or more of a dial, a slider switch, a joystick, a click wheel, a touch pad, a touch screen, a microphone, a speaker, sensors, a display light, a key pad, a display device, a scroll wheel, and a wireless communication based remote signal receiver, and/or any other suitable input mechanism, but is not limited thereto.

The communication interface 1620 may communicate with the first device 110 or the server 140 over the network 150. The communication interface 1620 may perform, for example, an interactive service such as any one or more of a messenger service, an e-mail service, a video call service, and a voice call service with the first device 110, but is not limited thereto.

When the second information which is generated from and/or based on first information obtained by the first device 110 is metadata, the communication interface 1620 may be controlled by the processor 1630, may request the server 140 to send original information based on the metadata, and may receive the original information from the server 140. Accordingly, the information input and output interface 1610 may output the original information. When the second information is received from the first device 110 by using the transmission method which links with the interactive service between the first device 110 and the second device 130 over the network 150, the second information may not have a data format which corresponds with the transmission method which links with the interactive service. When the second information is received by using a communication method of the interactive service, the second information may have a data format which corresponds with the interactive service.

The processor 1630 executes at least one program for performing the information transmission method which is stored in the memory 1640 according to an exemplary embodiment. In particular, the processor 1630 may execute the program, receive the information obtained by the first device 110 via the communication interface 1620 when the second device 130 performs the interactive service with the first device 110, and control the operation of outputting the above-described message and information via the information input and output interface 1610. The processor 1630 may receive a user input which indicates the above-described acceptance of the reception of the second information based on the output message and information via the information input and output interface 1610. If the user input which indicates the above-described acceptance of the reception of the second information is received, the processor 1630 may control the information input and output interface 1610 to output the information by using the transmission method which links with the interactive service.

After ending the interactive service between the first device 110 and the second device 130, the processor 1630 may receive and output the second information which is generated from and/or based on the first information obtained by the first device 110 by using the transmission method which links with the interactive service.

The memory 1640 may store the above-described at least one program and at least one communication application for the interactive service with the first device 110, but is not limited thereto. The memory 1640 may include at least one type of storage medium, such as a flash memory type, a hard disk type, a multimedia card micro type, a card type memory (for example, SD, XD memory, etc.), ROM, EEPROM, PROM magnetic memory, and an optical disk.

The information transmission method according to exemplary embodiments may also be embodied as computer readable codes on a transitory or non-transitory computer readable recording medium. The computer readable medium may be any recording apparatus which is capable of storing data that is read by a computer system, e.g., a read-only memory (ROM), a random access memory (RAM), a compact disc (CD)-ROM, a magnetic tape, a floppy disk, an optical data storage device, and/or any other suitable medium. The computer readable medium may be distributed among computer systems that are interconnected through a network, and the exemplary embodiments described above may be stored and implemented as computer readable code in a distributed manner.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A method for using a device to provide information, the method comprising:

obtaining, by the device, first information which is stored in a peripheral object of the device when an interactive service is performed between the device and at least one external device;

displaying the obtained first information on a display of the device;

receiving, from a user of the device, an information transmission request in response to the displaying the first information;

extracting second information from the obtained first information based on a preset reference information, wherein the second information includes information for obtaining original information corresponding to the obtained first information; and transmitting the second information to the at least one external device.

2. The method of claim 1, wherein the obtaining the first information comprises obtaining the first information via short distance communication with the peripheral object.

3. The method of claim 1, wherein the transmitting the second information to the at least one external device is performed via the interactive service.

4. The method of claim 1, wherein the second information corresponds to a part of the obtained first information.

5. The method of claim 1, wherein the first information comprises a uniform resource locator (URL), and wherein the extracting the second information comprises accessing the URL and extracting the second information from information which is available via the URL.

6. The method of claim 2, wherein the peripheral object comprises a tag for use with respect to the short distance communication, wherein the first information comprises information which is stored in the tag.

7. The method of claim 3, further comprising: converting a data format of the second information so that the second information is transmittable via the interactive service.

8. The method of claim 3, further comprising: after using the device to transmit the second information to the at least one external device, displaying a message which indicates a transfer status with respect to the second information.

9. The method of claim 2, wherein the short distance communication is based on one of near field communication (NFC)-based short distance wireless communication, radio frequency identification (RFID)-based short distance wireless communication, Bluetooth low energy (BLE)-based short distance wireless communication, barcode recognition-based technology, and quick response (QR) code recognition-based technology.

10. The method of claim 1, wherein the preset reference information includes information which relates to a predetermined amount of data, wherein the extracting the second information from the first information is performed by using the preset reference information and an amount of data of the first information.

11. A device, comprising:

an information obtainer which is configured to obtain first information which is stored in a peripheral object of the device;

a communication interface which is configured to transmit second information which is generated based on the first information to at least one external device when an interactive service is performed between the device and the at least one external device;

an information input and output interface which is configured to input and output information; and a processor which is configured to, when the interactive service between the device and the at least one external device is performed via the communication interface, control the information input and output interface to display the obtained first information on the information input and output interface, receive an information transmission request via the information input and output interface in response to the displaying the obtained first information, extract the second information from the obtained first information based on a preset reference information, wherein the second information includes information for obtaining original information corresponding to the obtained first information, and control the communication interface to transmit the second information to the at least one external device, wherein the processor is further configured to cause the information input and output interface to display the first information, and to extract the second information based on an information transmission request which is received, from a user of the device, via the communication interface in response to the display of the first information.

12. The device of claim 11, wherein the information obtainer is further configured to obtain the first information via short distance communication with the peripheral object.

13. The device of claim 11, wherein the processor is further configured to control the communication interface to transmit the second information to the at least one external device via the interactive service.

14. The device of claim 11, wherein the first information comprises a uniform resource locator (URL), and wherein the processor is further configured to access the URL and extract the second information from information which is available via the URL.

15. The device of claim 12, wherein the peripheral object comprises a tag for use with respect to the short distance communication, wherein the first information comprises information which is stored in the tag.

16. The device of claim 13, wherein the processor is further configured to convert a data format of the second information so that the second information is transmittable via the interactive service.

17. The device of claim 13, wherein the processor is further configured to cause the information input and output interface to display a message which indicates a transfer status with respect to the second information after the second information has been transmitted to the at least one external device.

18. The device of claim 12, wherein the short distance communication is based on one of near field communication (NFC)-based short distance wireless communication, radio frequency identification (RFID)-based short distance wireless communication, Bluetooth low energy (BLE)-based short distance wireless communication, a barcode recognition-based technology, and a quick response (QR) code recognition-based technology.

19. The device of claim 11, wherein the preset reference information includes information which relates to a predetermined amount of data, wherein the extracting the second information from the first information is performed by using the preset reference information and an amount of data of the first information.

20. An information transmission system comprising:
a first device which is configured to obtain first information which is stored in a peripheral object via short distance communication with the peripheral object when an interactive service between the first device and at least one second device is performed, display the obtained first information on a display of the first device, receive, from a user of the first device, an information transmission request in response to the displaying the first information, extract second information from the obtained first information based on a preset reference information, wherein the second information includes information for obtaining original information corresponding to the first information, and transmit the second information to the at least one second device via the interactive service; and
the at least one second device which is configured to receive the second information from the first device via the interactive service and to output the received second information.

21. The system of claim 20, wherein the preset reference information includes information which relates to a predetermined amount of data,
wherein the extracting the second information from the first information is performed by using the preset reference information and an amount of data of the first information.

22. A method for transferring information between a first device and at least one second device when an interactive service is being performed therebetween, the method comprising:
displaying a content which is accessible by the first device;
receiving, from a user of the first device, and in response to the displaying, an information transmission request;
extracting, by the first device, information which relates to the content which is accessible by the first device; and
transmitting the extracted information to the at least one second device,
wherein the extracting the information comprises obtaining the content via short distance communication with a peripheral object of the first device and extracting the information from the obtained content based on a preset reference information.

23. The method of claim 22, wherein the transmitting the extracted information to the at least one second device comprises using the first device to transmit the second information to the at least one second device via the interactive service.

24. The method of claim 22, wherein the content comprises content which is associated with a uniform resource locator (URL), and wherein the extracting the information comprises accessing the URL and extracting the information from the content which is associated with the URL.

25. The method of claim 22, wherein the short distance communication is based on one of near field communication (NFC)-based short distance wireless communication, radio frequency identification (RFID)-based short distance wireless communication, Bluetooth low energy (BLE)-based short distance wireless communication, barcode recognition-based technology, and quick response (QR) code recognition-based technology.

26. The method of claim 22, wherein the preset reference information includes information which relates to a predetermined amount of data,
wherein the extracting the second information from the first information is performed by using the preset reference information and an amount of data of the first information.

* * * * *